US012665462B2

(12) United States Patent
Suizu et al.

(10) Patent No.: US 12,665,462 B2
(45) Date of Patent: Jun. 23, 2026

(54) VIBRATION GENERATING DEVICE, AND PRODUCTION METHOD THEREFOR

(71) Applicant: ALPS ALPINE CO., LTD., Tokyo (JP)

(72) Inventors: Takayuki Suizu, Miyagi (JP); Masaaki Mikawa, Miyagi (JP); Takahiro Umezu, Miyagi (JP); Takayuki Mizuhashi, Fukushima (JP); Ryota Suzuki, Miyagi (JP); Yuki Ikezoe, Miyagi (JP); Kazuhiro Takahashi, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 211 days.

(21) Appl. No.: 18/776,778

(22) Filed: Jul. 18, 2024

(65) Prior Publication Data

US 2025/0047161 A1 Feb. 6, 2025

(30) Foreign Application Priority Data

Aug. 1, 2023 (JP) ................................. 2023-125732

(51) Int. Cl.
| | |
|---|---|
| *H02K 5/04* | (2006.01) |
| *H02K 15/14* | (2006.01) |
| *H02K 33/02* | (2006.01) |

(52) U.S. Cl.
CPC ............... *H02K 5/04* (2013.01); *H02K 15/14* (2013.01); *H02K 33/02* (2013.01)

(58) Field of Classification Search
CPC ........ C10L 1/328; H02K 15/14; H02K 33/02; H02K 33/16; H02K 5/04
See application file for complete search history.

(56) References Cited

U.S. PATENT DOCUMENTS

| | | | | |
|---|---|---|---|---|
| 2012/0169148 A1* | 7/2012 | Kim | ...................... | H02K 33/16 |
| | | | | 310/25 |
| 2017/0019009 A1 | 1/2017 | Xu et al. | | |
| 2021/0044190 A1* | 2/2021 | Mori | ...................... | H02K 33/18 |
| 2022/0302813 A1* | 9/2022 | Maeda | ................... | H02K 33/02 |
| 2023/0012117 A1 | 1/2023 | Hatano et al. | | |

FOREIGN PATENT DOCUMENTS

| | | |
|---|---|---|
| JP | 2017-028976 | 2/2017 |
| JP | 2023-009796 | 1/2023 |

* cited by examiner

*Primary Examiner* — Naishadh N Desai
(74) *Attorney, Agent, or Firm* — IPUSA, PLLC

(57) ABSTRACT

A vibration generating device includes a housing; a movable body housed in the housing; a support configured to support the movable body so as to be vibratable; a bracket that includes a main plate and an attachment plate extending from the main plate, and is attached to the housing via the attachment plate; a coil attached to the main plate; and a permanent magnet attached to the movable body and configured to generate a magnetic flux toward the coil.

11 Claims, 22 Drawing Sheets

FIG.21

VIBRATION GENERATING DEVICE, AND PRODUCTION METHOD THEREFOR

CROSS-REFERENCE TO RELATED APPLICATIONS

The present application is based on and claims priority to Japanese Patent Application No. 2023-125732 filed on Aug. 1, 2023, the entire contents of which are hereby incorporated by reference.

BACKGROUND

1. Field of the Invention

The present disclosure relates to vibration generating devices, and production methods therefor.

2. Description of the Related Art

A vibration motor (vibration generating device) configured to generate vibration is known in Japanese Laid-Open Patent Application No. 2017-028976. This vibration motor includes a stator and a vibrator. The stator includes a coil supported by a coil holder fixed to a housing via an L-shaped support arm, and the vibrator includes magnetic steel. The coil holder and the housing are fixed to each other through welding.

However, when the melting point of a material forming the coil holder is different from the melting point of a material forming the housing, it is challenging to fix the coil holder and the housing to each other through welding.

Meanwhile, an actuator (vibration generating device) formed without welding is known in Japanese Laid-Open Patent Application No. 2023-009796. This actuator includes a support and a movable body. The support includes a coil supported by a plate fixed to a casing, and the movable body includes a magnet. The casing is formed of a metal plate, and includes a first casing and a second casing. A part (projecting plate) of a plate formed of the metal plate is held between a first curved portion projecting upward and a second curved portion projecting downward. The first casing is provided with the first curved portion. The second casing is provided with the second curved portion. A force (holding force) to bring the first curved portion and the second curved portion, which hold a part of the plate therebetween, closer to each other is obtained by an approximately L-shaped hook that is formed by a part of the second casing.

SUMMARY

A vibration generating device according to an embodiment of the present disclosure includes: a housing; a movable body housed in the housing; a support configured to support the movable body so as to be vibratable; a bracket that includes a main plate and an attachment plate extending from the main plate, and is attached to the housing via the attachment plate; a coil attached to the main plate; and a permanent magnet attached to the movable body and configured to generate a magnetic flux toward the coil. The housing includes a bottom plate, a side plate perpendicular to the bottom plate, and an attachment plate support configured to support the attachment plate of the bracket. The side plate includes a beam plate provided so as to face the attachment plate support in a plate thickness direction of the main plate of the bracket. The attachment plate is disposed such that a plate thickness direction of the beam plate that is a part of the side plate crosses the plate thickness direction of the main plate of the bracket. The attachment plate is held between the attachment plate support and the beam plate.

BRIEF DESCRIPTION OF DRAWINGS

FIG. 21 is left-hand side views of a part of the vibration generating device;

DETAILED DESCRIPTION OF THE DISCLOSURE

The hook disclosed in Japanese Laid-Open Patent Application No. 2023-009796 as described above generates the holding force by contacting a plate-like portion extending parallel to the part (projecting plate) of the plate, with a plate-like portion vertically extending at the part (projecting plate) of the plate. Therefore, the hook is prone to elastic deformation, and the casing (housing) and the plate (coil bracket) cannot be firmly fixed.

Therefore, it is desirable to provide a vibration generating device that can firmly fix the coil bracket to the housing without welding.

Figure 1:
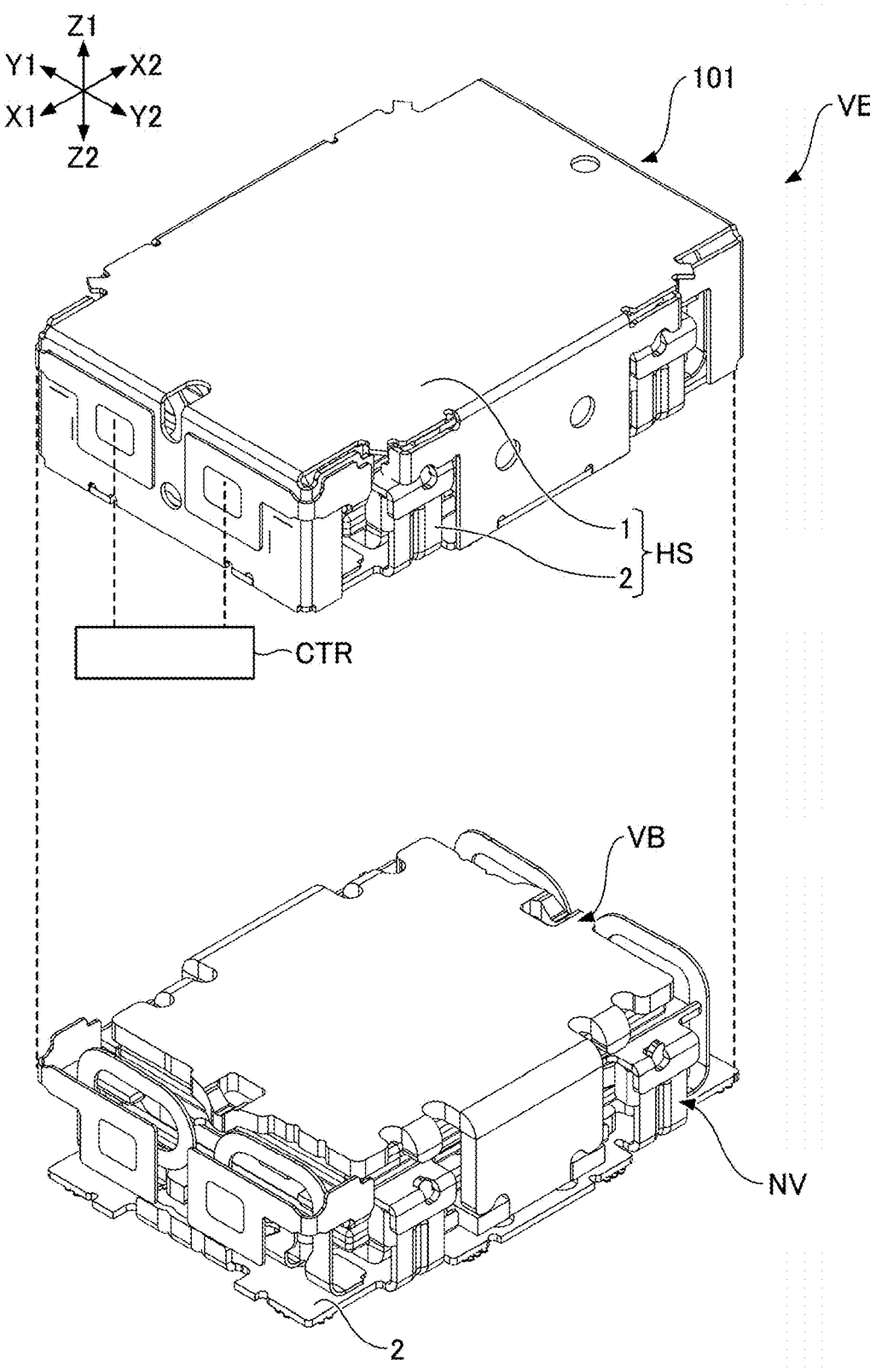
FIG. 1 is a perspective view of a vibration generating device.
Figure 2:
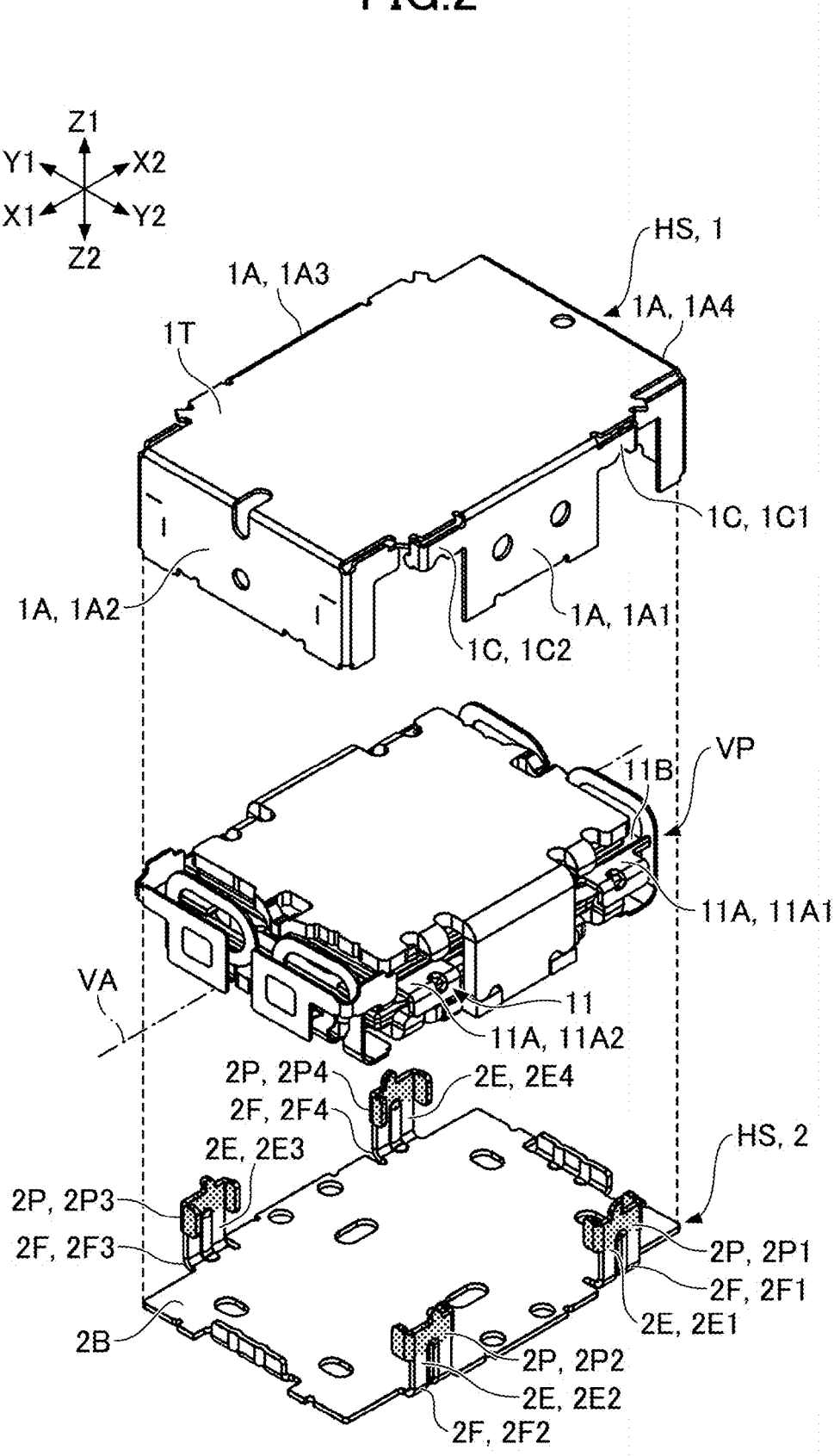
FIG. 2 is an exploded perspective view of the vibration generating device.

Hereinafter, a vibrating device VE including a vibration generating device 101 according to an embodiment of the present disclosure will be described with reference to the drawings. FIG. 1 is a perspective view of the vibrating device VE including the vibration generating device 101 and a controller CTR. Specifically, the upper view of FIG. 1 is a perspective view of the vibration generating device 101 connected to the controller CTR, and the lower view of FIG. 1 is a perspective view of the vibration generating device 101 with a cover member 1 being removed. FIG. 2 is an exploded perspective view of the vibration generating device 101.

In FIGS. 1 and 2, X1 represents one direction of an X axis that forms a three-dimensional orthogonal coordinate system, and X2 represents the other direction of the X axis. Also, Y1 represents one direction of a Y axis that forms the three-dimensional orthogonal coordinate system, and Y2 represents the other direction of the Y axis. Similarly, Z1 represents one direction of a Z axis that forms the three-dimensional orthogonal coordinate system, and Z2 represents the other direction of the Z axis. In the present embodiment, an X1 side of the vibration generating device 101 corresponds to a front side (front-surface side) of the vibration generating device 101, and an X2 side of the vibration generating device 101 corresponds to a back side (back-surface side) of the vibration generating device 101. Also, a Y1 side of the vibration generating device 101 corresponds to a left-hand side of the vibration generating device 101, and a Y2 side of the vibration generating device 101 corresponds to a right-hand side of the vibration generating device 101. A Z1 side of the vibration generating device 101 corresponds to an upper side of the vibration generating device 101, and a Z2 side of the vibration generating device 101 corresponds to a lower side of the vibration generating device 101. The same applies to the other drawings.

The vibrating device VE includes the controller CTR and the vibration generating device 101. The vibration generating device 101 includes a housing HS and a vibrating portion VP housed in the housing HS.

As illustrated in FIG. 1, the housing HS has an outer shape of an approximately rectangular parallelepiped. In the present embodiment, the housing HS is formed of a nonmagnetic material, such as austenitic stainless steel or the like. The housing HS includes the cover member 1 and a base member 2.

As illustrated in FIG. 2, the cover member 1 is formed to form side surfaces and an upper surface of the housing HS, and the base member 2 is formed to form a bottom surface of the housing HS. In the illustrated example, the base member 2 is formed to function as a base configured to support the vibrating portion VP.

In the illustrated example, the cover member 1 includes: an outer peripheral wall portion 1A having an approximately rectangular cylindrical shape; and a flat top plate 1T provided so as to be continuous with an upper end (end on the Z1 side) of the outer peripheral wall portion 1A.

The outer peripheral wall portion 1A includes four side plates each formed in the form of a flat plate. Specifically, as illustrated in FIG. 2, the outer peripheral wall portion 1A includes a first side plate 1A1 and a third side plate 1A3 that face each other, and a second side plate 1A2 and a fourth side plate 1A4 that face each other. The first side plate 1A1 and the third side plate 1A3 are perpendicular to the second side plate 1A2 and the fourth side plate 1A4.

The controller CTR is configured to achieve the movement of the vibrating portion VP. In the illustrated example, the controller CTR includes an electronic circuit and is configured to supply, to the vibrating portion VP, an AC current for vibrating the vibrating portion VP. In the illustrated example, the controller CTR is provided externally of the housing HS. However, the controller CTR may be provided in the housing HS. In this case, the controller CTR may be one of the components of the vibration generating device 101.

The vibrating portion VP is configured to vibrate by itself, thereby vibrating the housing HS. In the illustrated example, the vibrating portion VP is attached in the housing HS, thereby vibrating the housing HS.

Figure 3:
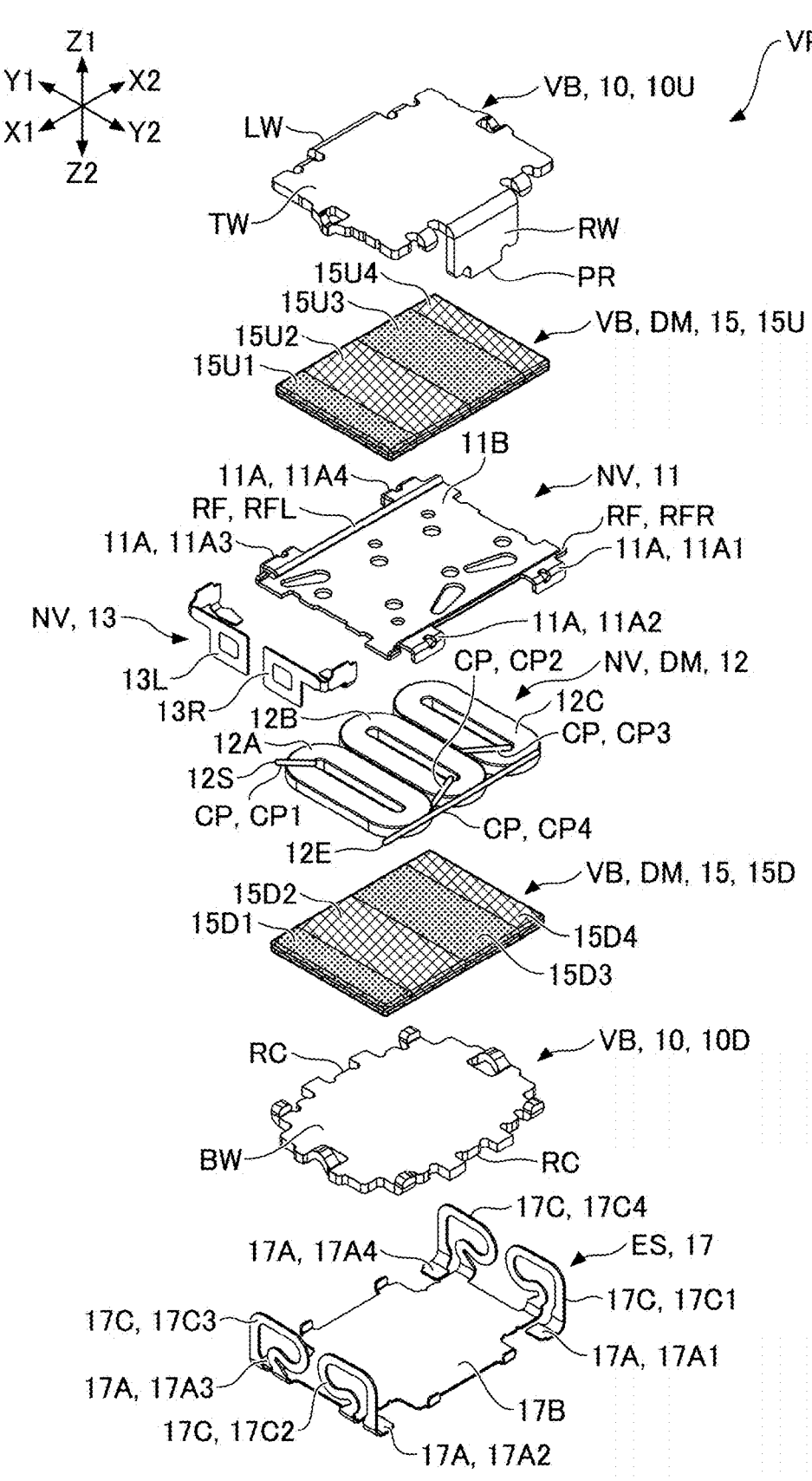
FIG. 3 is an exploded perspective view of a vibrating portion and a non-vibrating body.

Next, details of the vibrating portion VP will be described with reference to FIG. 3. FIG. 3 is an exploded perspective view of the vibrating portion VP. The vibrating portion VP includes a vibrating body VB, a driver DM, and an elastic support ES.

The vibrating body VB serving as a movable body has a predetermined natural frequency, and is configured to vibrate relative to the housing HS along a vibration axis VA (see FIG. 2) extending in a predetermined direction. In the illustrated example, the vibrating body VB has a predetermined natural frequency and is configured to vibrate relative to the base member 2 along the vibration axis VA (see FIG. 2) extending in an X-axis direction (forward-backward direction).

The driver DM is an example of a vibration force generator, and is configured to vibrate the vibrating body VB along the vibration axis VA. In the illustrated example, the driver DM is configured to vibrate the vibrating body VB, elastically supported by the elastic support ES, along the vibration axis VA in accordance with an AC current supplied through the controller CTR.

The elastic support ES is an example of the support, and is configured to elastically support the vibrating body VB by interposing between the housing HS and the vibrating body VB.

Specifically, the vibrating portion VP including the vibrating body VB, the driver DM, and the elastic support ES includes a yoke 10, a bracket 11, a coil 12, a wiring board 13, a magnet 15, and a leaf spring 17. The vibrating body VB includes the yoke 10 and the magnet 15, the driver DM includes the coil 12 and the magnet 15, and the elastic support ES includes the leaf spring 17. The bracket 11, the coil 12, and the wiring board 13 form a non-vibrating body NV that does not vibrate together with the vibrating body VB. The non-vibrating body NV vibrates together with the housing HS, but does not vibrate together with the vibrating body VB.

The yoke 10 is a member forming a magnetic circuit. In the embodiment, the yoke 10 is formed of a magnetic material including iron and the like. In the illustrated example, the yoke 10 is formed of two members, i.e., an upper yoke 10U and a lower yoke 10D, and is formed of steel plate cold commercial (SPCC). The upper yoke 10U is a member forming the upper surface of the vibrating body VB, and includes a left-hand plate LW, a right-hand plate RW, and a top plate TW. Specifically, projections PR are formed at the end surfaces, on the 22 side, of the left-hand plate LW and the right-hand plate RW so as to be engaged with recesses RC formed at the lower yoke 10D. The lower yoke 10D is a member forming the lower surface of the vibrating body VB, and includes a bottom plate BW. Specifically, the recesses RC are formed at the end surface of the lower yoke 10D on the Y1 side (left-hand side) and at the end surface of the lower yoke 10D on the Y2 side (right-hand side) so as to be engaged with the projections PR formed at the upper yoke 10U.

The bracket 11 is an example of a conductive member configured to function as a coil bracket configured to hold the coil 12. The bracket 11 is configured so as to support the coil 12 in a state in which the coil 12 faces the magnet 15 in a non-contact manner. That is, the bracket 11 is configured to function as a coil holder configured to support the coil 12. The bracket 11 is fixed to the base member 2 so as not to contact the vibrating body VB. In the present embodiment, the bracket 11 is a plate-like member formed of a non-magnetic material, such as copper, aluminum, alloys thereof, or the like, and includes attachment plates 11A and a main plate 11B. Specifically, the bracket 11 is fixed to the housing HS via four attachment plates 11A that project outward of the main plate 11B.

More specifically, the bracket 11 is fixed to the housing HS at a position at which the bracket 11 and the coil 12 do not contact the vibrating body VB even if the vibrating body VB is vibrating. That is, the bracket 11 to which the coil 12 is to be attached is configured not to vibrate together with the vibrating body VB.

The coil 12 is configured to generate a magnetic field by receiving supply of a current. In the example as illustrated in FIG. 3, the coil 12 includes three coil-wound portions (a first coil-wound portion 12A, a second coil-wound portion 12B, and a third coil-wound portion 12C) that are connected in series. Each of the first coil-wound portion 12A, the second coil-wound portion 12B, and the third coil-wound portion 12C has an approximately elliptical shape (rectangle having rounded corners) having a major axis along a Y-axis direction. The coil 12 includes: a first end 12S at which winding starts; and a second end 12E at which winding ends. The coil 12 is fixed to a surface of the bracket 11 on the Z2 side (lower side) with an adhesive or the like. The surface of the conductive wires forming the coil 12 (wires formed of copper, copper alloys, or the like) is coated with an insulating coating. In FIG. 3, for clarification, the coil 12 is illustrated in a simplified manner, and illustration of a detailed winding state is omitted. The same applies to the other drawings.

Figure 4:
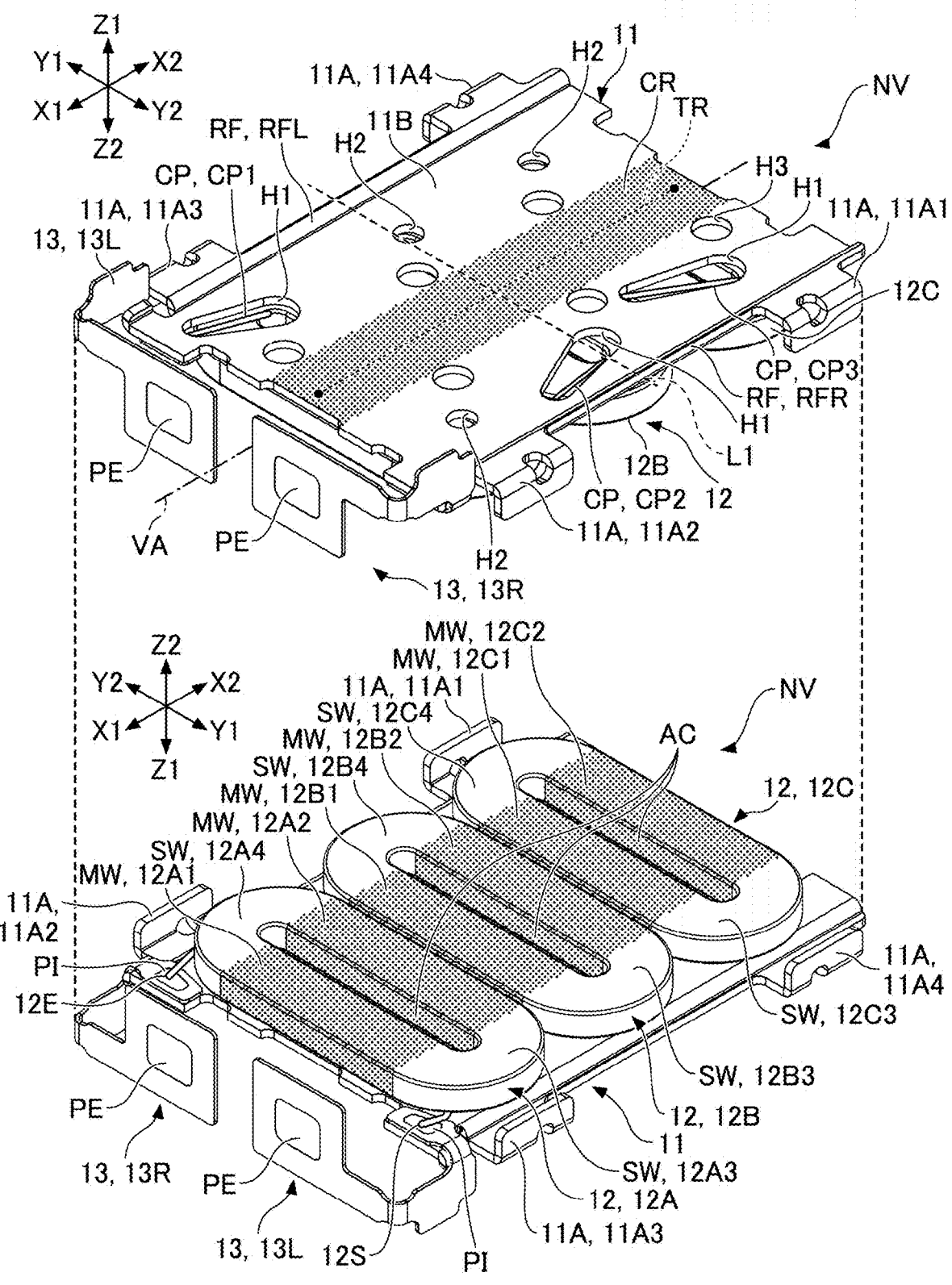
FIG. 4 is a perspective view of the non-vibrating body.

The wiring board 13 is a member to which the first end 12S and the second end 12E of the coil 12 are connected. As illustrated in the lower view of FIG. 4, the wiring board 13 is fixed to a surface of the bracket 11 on the Z2 side (lower side) with an adhesive. FIG. 4 is a perspective view of the non-vibrating body NV. Specifically, the upper view of FIG. 4 is an upper perspective view of the non-vibrating body NV, and the lower view of FIG. 4 is a lower perspective view of the non-vibrating body NV.

In the illustrated example, the wiring board 13 is a flexible wiring board having flexibility, and includes a left-hand wiring board 13L and a right-hand wiring board 13R. The left-hand wiring board 13L and the right-hand wiring board 13R are fixed to an end of the bracket 11 on the X1 side (front side) with an adhesive or the like. As illustrated in the lower view of FIG. 4, the first end 12S of the coil 12 is connected to an inner conductor pattern PI of the right-hand wiring board 13R with solder, a conductive adhesive, or the like, and the second end 12E of the coil 12 is connected to the inner conductor pattern PI of the left-hand wiring board 13L with solder, a conductive adhesive, or the like. An outer conductor pattern PE of each of the left-hand wiring board 13L and the right-hand wiring board 13R is connected to the conductive wire from the controller CTR with solder, a conductive adhesive, or the like. Also, "inner" means a position that is closer to the center of the vibration generating device 101 than is "outer".

Each of the first coil-wound portion 12A, the second coil-wound portion 12B, and the third coil-wound portion 12C has a hollow core AC. The first end 12S, the first coil-wound portion 12A, the second coil-wound portion 12B, the third coil-wound portion 12C, and the second end 12E are connected by a conductor portion CP. Specifically, the conductor portion CP includes a first conductor portion CP1 to a fourth conductor portion CP4, as illustrated in FIG. 3. The first end 12S and the first coil-wound portion 12A are connected by the first conductor portion CP1, the first coil-wound portion 12A and the second coil-wound portion 12B are connected by the second conductor portion CP2, the second coil-wound portion 12B and the third coil-wound portion 12C are connected by the third conductor portion CP3, and the third coil-wound portion 12C and the second end 12E are connected by the fourth conductor portion CP4.

Also, as illustrated in the lower view of FIG. 4, the coil 12 includes main wire bundles MW extending along the Y-axis direction and a sub wire bundle SW connecting two of the main wire bundles MW next to each other. In the illustrated example, the main wire bundle MW has a rectangular shape in a top plan view and includes a plurality of conductive wires extending in the Y-axis direction (leftward-rightward direction), and the sub wire bundle SW has an approximately semicircular shape in a top plan view and includes a plurality of conductive wires extending concentrically. Specifically, the first coil-wound portion 12A includes a forward main wire bundle 12A1, a backward main wire bundle 12A2, a left-hand sub wire bundle 12A3, and a right-hand sub wire bundle 12A4. The second coil-wound portion 12B includes a forward main wire bundle 12B1, a backward main wire bundle 12B2, a left-hand sub wire bundle 12B3, and a right-hand sub wire bundle 12B4. The third coil-wound portion 12C includes a forward main wire bundle 12C1, a backward main wire bundle 12C2, a left-hand sub wire bundle 12C3, and a right-hand sub wire bundle 12C4. The main wire bundle MW includes the forward main wire bundle 12A1, the backward main wire bundle 12A2, the forward main wire bundle 12B1, the backward main wire bundle 12B2, the forward main wire bundle 12C1, and the backward main wire bundle 12C2. The sub wire bundle SW includes the left-hand sub wire bundle 12A3, the right-hand sub wire bundle 12A4, the left-hand sub wire bundle 12B3, the right-hand sub wire bundle 12B4, the left-hand sub wire bundle 12C3, and the right-hand sub wire bundle 12C4. In the lower view of FIG. 4, for clarification, the main wire bundle MW of the coil 12 is provided with a dot pattern.

The magnet 15 is an example of a magnetic flux generating member, and forms the driver DM together with the coil 12. As illustrated in FIG. 3, the magnet 15 includes an upper magnet 15U and a lower magnet 15D. Each of the upper magnet 15U and the lower magnet 15D is an octopolar magnetized permanent magnet having an outer shape of an approximately rectangular parallelepiped.

Specifically, the upper magnet 15U includes a first upper magnet portion 15U1 to a fourth upper magnet portion 1504, and the lower magnet 15D includes a first lower magnet portion 15D1 to a fourth lower magnet portion 15D4. The first upper magnet portion 15U1 to the fourth upper magnet portion 1504 and the first lower magnet portion 15D1 to the fourth lower magnet portion 15D4 each include one N-pole portion and one S-pole portion. In the illustrated example, the upper surfaces of the first upper magnet portion 15U1, the third upper magnet portion 1503, the first lower magnet portion 15D1, and the third lower magnet portion 15D3 are N poles, and the upper surfaces of the second upper magnet portion 1502, the fourth upper magnet portion 1504, the second lower magnet portion 15D2, and the fourth lower magnet portion 15D4 are S poles. In FIG. 3, for clarification, the N poles of the octopolar magnetized permanent magnet are provided with a dot pattern, and the S poles of the octopolar magnetized permanent magnet are provided with a cross pattern. The same applies to the other drawings. The upper magnet 15U and the lower magnet 15D may be a combination of four bipolar magnetized permanent magnets or may be a combination of two tetrapolar magnetized permanent magnets.

The leaf spring 17 is an example of the elastic support ES that is interposed between the housing HS and the vibrating body VB and is configured to elastically support the vibrating body VB. In the present embodiment, the leaf spring 17 is formed of a non-magnetic material, such as austenitic stainless steel or the like, and includes a connection portion 17A, a vibrating body support 17B, and an elastic arm 17C, as illustrated in FIG. 3.

Figure 5:
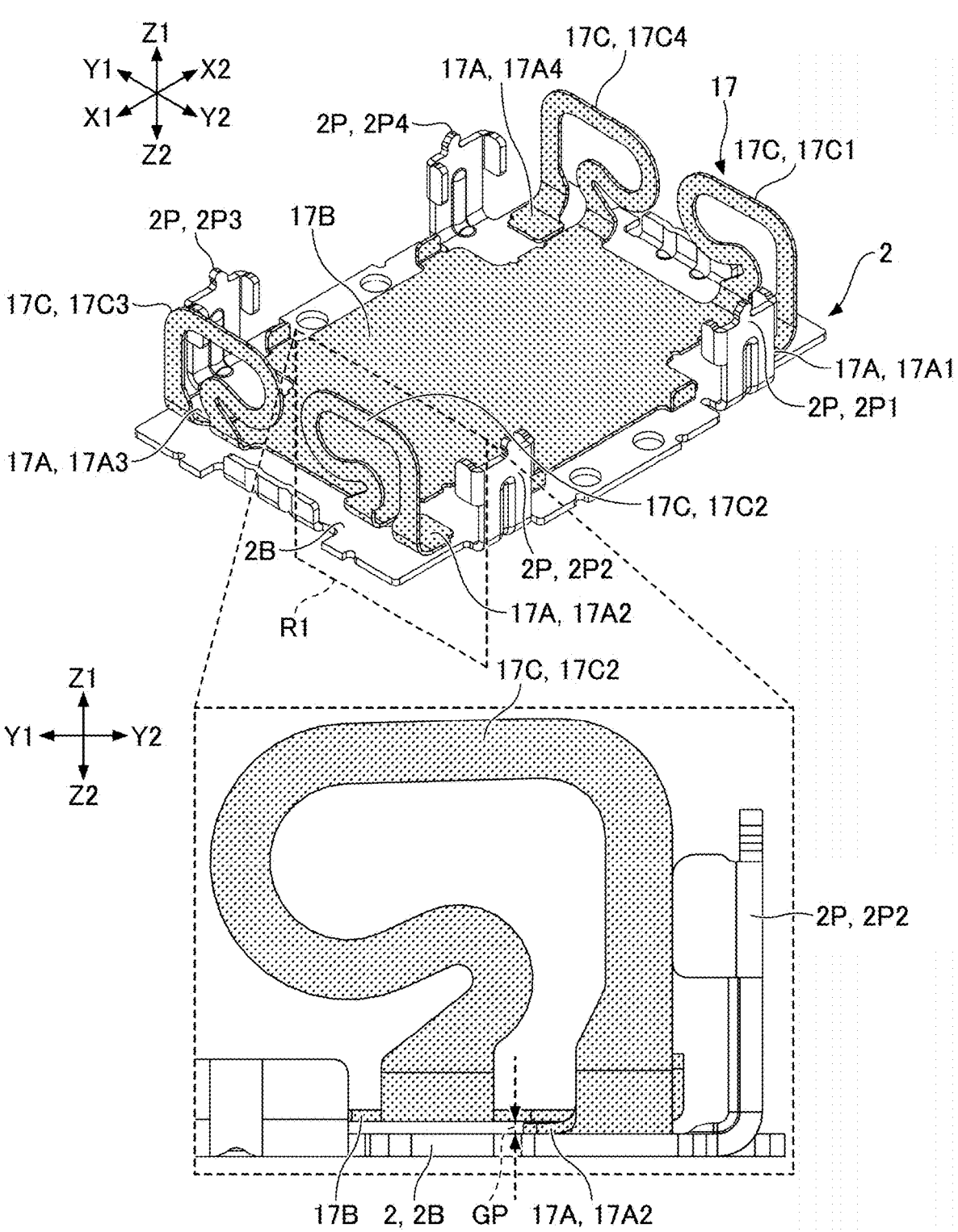
FIG. 5 is a view illustrating a configuration example of a base member and an elastic support.

Specifically, the leaf spring 17 is formed, for example, by punching and bending a 0.2 mm-thick metal plate formed of austenitic stainless steel. More specifically, as illustrated in FIG. 5, the connection portion 17A of the leaf spring 17 is welded to a bottom plate 2B of the base member 2. The leaf spring 17 is attached to the base member 2 only via the connection portion 17A. This attachment of the leaf spring 17 to the base member 2 is achieved in a state in which a gap GP is formed between the vibrating body support 17B and the bottom plate 2B of the base member 2 so as to avoid contact of the vibrating body support 17B and the elastic arm 17C with the base member 2.

FIG. 5 is a view illustrating a configuration example of the base member 2 and the elastic support ES (leaf spring 17). Specifically, the upper view of FIG. 5 is a perspective view of the base member 2 to which the elastic support ES (leaf spring 17) is attached. The lower view of FIG. 5 is a front view of the base member 2 to which the elastic support ES (leaf spring 17) is attached, and corresponds to an enlarged view of a range R1 enclosed by a dashed line in the upper view of FIG. 5. In FIG. 5, for clarification, the elastic support ES (leaf spring 17) is provided with a dot pattern.

In the present embodiment, as illustrated in the upper view of FIG. 5, the connection portion 17A of the leaf spring 17 includes a first connection portion 17A1 to a fourth connection portion 17A4, and the elastic arm 17C of the leaf spring 17 includes a first elastic arm 17C1 to a fourth elastic arm 17C4.

Figure 6:
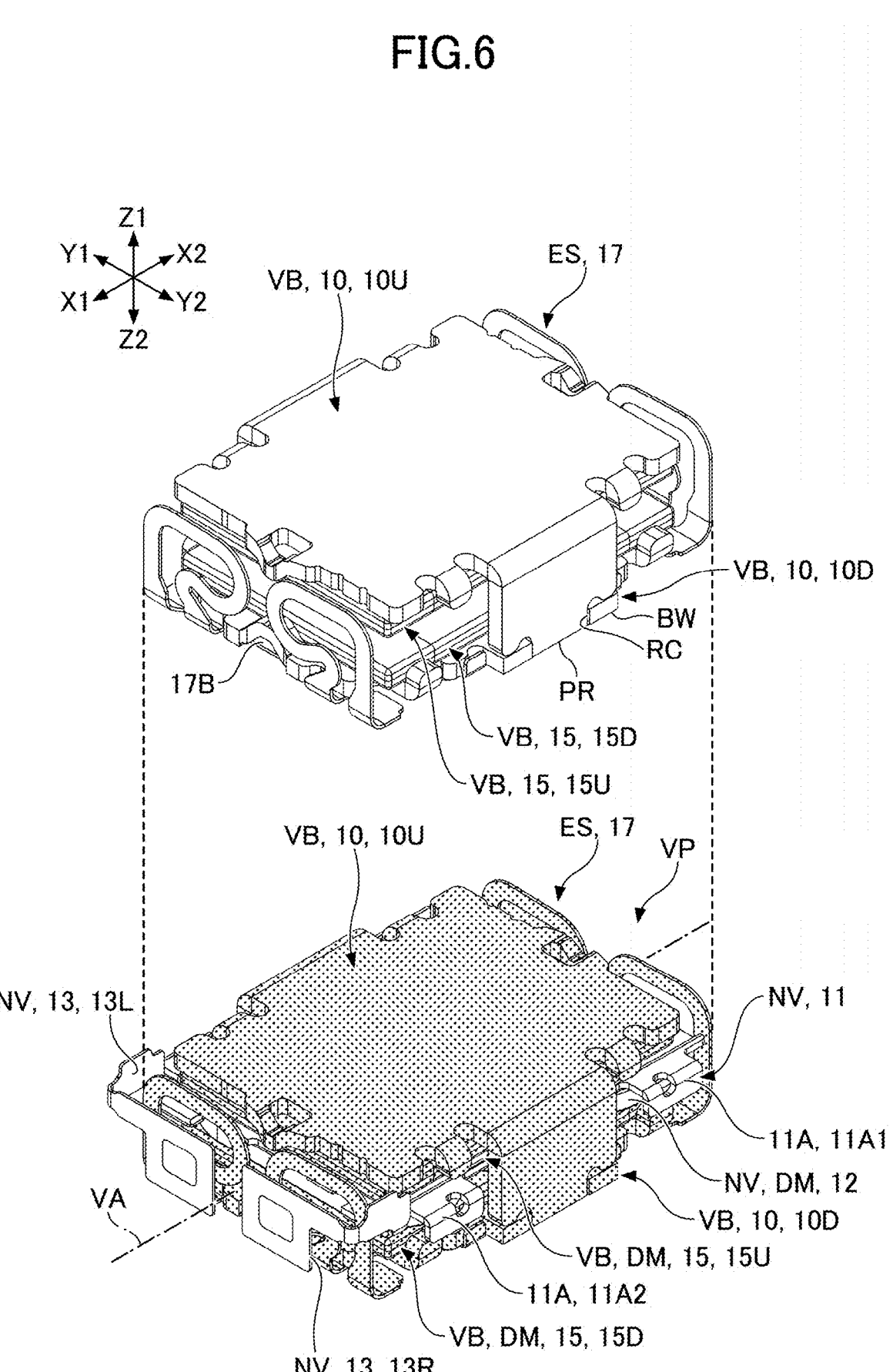
FIG. 6 is a perspective view of the vibrating portion and the non-vibrating body.

As illustrated in the upper view of FIG. 5, the first connection portion 17A1 to the fourth connection portion 17A4 are fixed to the bottom plate 2B of the base member 2 through welding. Also, as illustrated in FIG. 6, the vibrating body VB is welded to the vibrating body support 17B of the leaf spring 17. FIG. 6 is a perspective view of the vibrating portion VP. Specifically, the upper view of FIG. 6 is a perspective view of the vibrating portion VP (elastic support ES and vibrating body VB) with illustration of the non-vibrating body NV (bracket 11, coil 12, and wiring board 13) being omitted. The lower view of FIG. 6 is a perspective view of the vibrating portion VP with the non-vibrating body NV being illustrated. In the lower view of FIG. 6, for clarification, vibrating portions (vibrating body VB and elastic support ES) are provided with a dot pattern. The presence of the dot pattern indicates that the non-vibrating body NV, which is not provided with the dot pattern, is fixed to the base member 2 (not illustrated in the lower view of FIG. 6) so as not to contact the vibrating body VB provided with the dot pattern. The lower view of FIG. 1 illustrates the non-vibrating body NV that is fixed to the base member 2 so as not to contact the vibrating body VB.

Specifically, as illustrated in the upper view of FIG. 6, the vibrating body VB includes the upper yoke 10U, the upper magnet 15U, the lower magnet 15D, and the lower yoke 10D. A surface on the Z2 side (lower side) of the bottom plate BW of the lower yoke 10D is welded to a surface on the Z1 side (upper side) of the vibrating body support 17B of the leaf spring 17.

When an AC current is applied to the coil 12 via the wiring board 13 in the state as illustrated in the lower view of FIG. 6, the vibrating body VB vibrates along the vibration axis VA.

Figure 7:
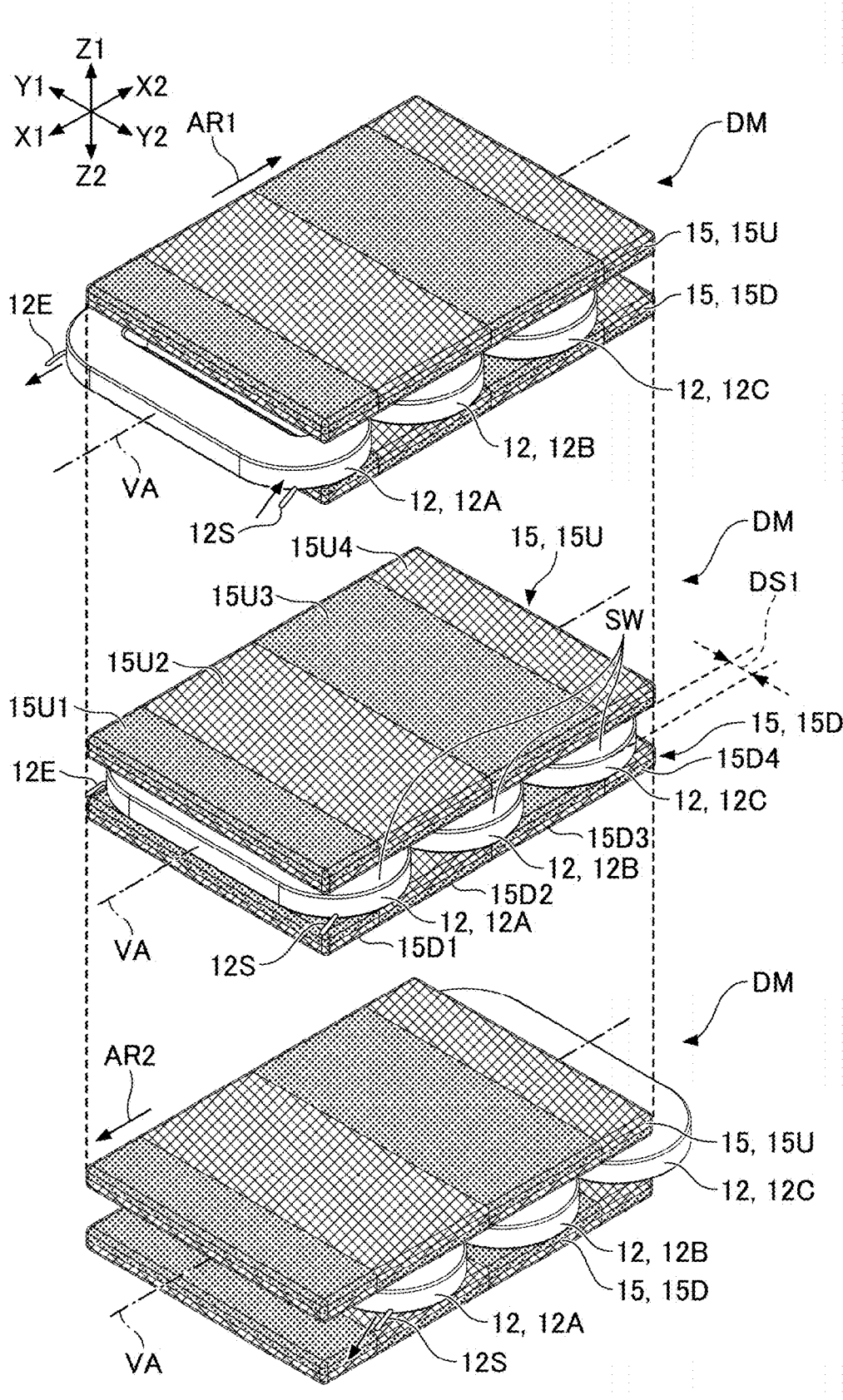
FIG. 7 is a perspective view of a driver.

A positional relationship between the components of the driver DM when the vibrating body VB vibrates along the vibration axis VA will be described with reference to FIG. 7. FIG. 7 is a perspective view of the components of the driver DM. Specifically, the upper view of FIG. 7 illustrates the positional relationship between the non-vibrating body NV (coil 12) and the vibrating body VB (magnet 15) when a current flows through the coil 12 in one direction and the vibrating body VB (magnet 15) moves to a location the closest to the X2-side end (back-side end). The middle view of FIG. 7 illustrates the positional relationship between the non-vibrating body NV (coil 12) and the vibrating body VB (magnet 15) when no current flows through the coil 12. The lower view of FIG. 7 illustrates the positional relationship between the non-vibrating body NV (coil 12) and the vibrating body VB (magnet 15) when a current flows through the coil 12 in the other direction and the vibrating body VB (magnet 15) moves to a location the closest to the X1-side end (front-side end).

When no current flows through the coil 12, the coil 12 generates no magnetic field. Thus, neither a repulsive force nor an attractive force is generated between the coil 12 and the magnet 15. Therefore, as illustrated in the middle view of FIG. 7, the magnet 15 is positioned at a neutral position such that the center of the magnet 15 faces the center of the coil 12 (second coil-wound portion 12B). Specifically, the vibrating body VB (magnet 15) at a position other than the neutral position is biased so as to return to the neutral position by the action of the elastic support ES (leaf spring 17).

When a current flows from the first end 12S to the second end 12E of the coil 12, the first coil-wound portion 12A generates a magnetic field such that the Z1 side becomes the N pole and the Z2 side becomes the S pole, the second coil-wound portion 12B generates a magnetic field such that the Z2 side becomes the N pole and the Z1 side becomes the S pole, and the third coil-wound portion 12C generates a magnetic field such that the Z1 side becomes the N pole and the Z2 side becomes the S pole. As a result, the N-pole portion of the second upper magnet portion 1502 is moved away from the first coil-wound portion 12A and is attracted to the second coil-wound portion 12B, the S-pole portion of the third upper magnet portion 1503 is moved away from the second coil-wound portion 12B and is attracted to the third coil-wound portion 12C, the S-pole portion of the second lower magnet portion 15D2 is moved away from the first coil-wound portion 12A and is attracted to the second coil-wound portion 12B, and the N-pole portion of the third lower magnet portion 15D3 is moved away from the second coil-wound portion 12B and is attracted to the third coil-wound portion 12C. Thereby, the vibrating body VB (magnet 15) is moved to the X2 side (back side) as indicated by an arrow AR1 in the upper view of FIG. 7.

Meanwhile, when a current flows from the second end 12E to the first end 12S of the coil 12, the first coil-wound portion 12A generates a magnetic field such that the Z1 side becomes the S pole and the Z2 side becomes the N pole, the second coil-wound portion 12B generates a magnetic field such that the 22 side becomes the S pole and the Z1 side becomes the N pole, and the third coil-wound portion 12C generates a magnetic field such that the Z1 side becomes the S pole and the Z2 side becomes the N pole. As a result, the N-pole portion of the second upper magnet portion 1502 is moved away from the second coil-wound portion 12B and is attracted to the first coil-wound portion 12A, the S-pole portion of the third upper magnet portion 1503 is moved away from the third coil-wound portion 12C and is attracted to the second coil-wound portion 12B, the S-pole portion of the second lower magnet portion 15D2 is moved away from the second coil-wound portion 12B and is attracted to the first coil-wound portion 12A, and the N-pole portion of the third lower magnet portion 15D3 is moved away from the third coil-wound portion 12C and is attracted to the second coil-wound portion 12B. Thereby, the vibrating body VB (magnet 15) is moved to the X1 side (front side) as indicated by an arrow AR2 in the lower view of FIG. 7.

The controller CTR can alternately reverse the direction of the magnetic field generated by the coil 12 by alternately reversing the direction of the current flowing through the coil 12. Hence, the controller CTR can vibrate the vibrating body VB (magnet 15) along the vibration axis VA (X-axis direction).

Figure 8:
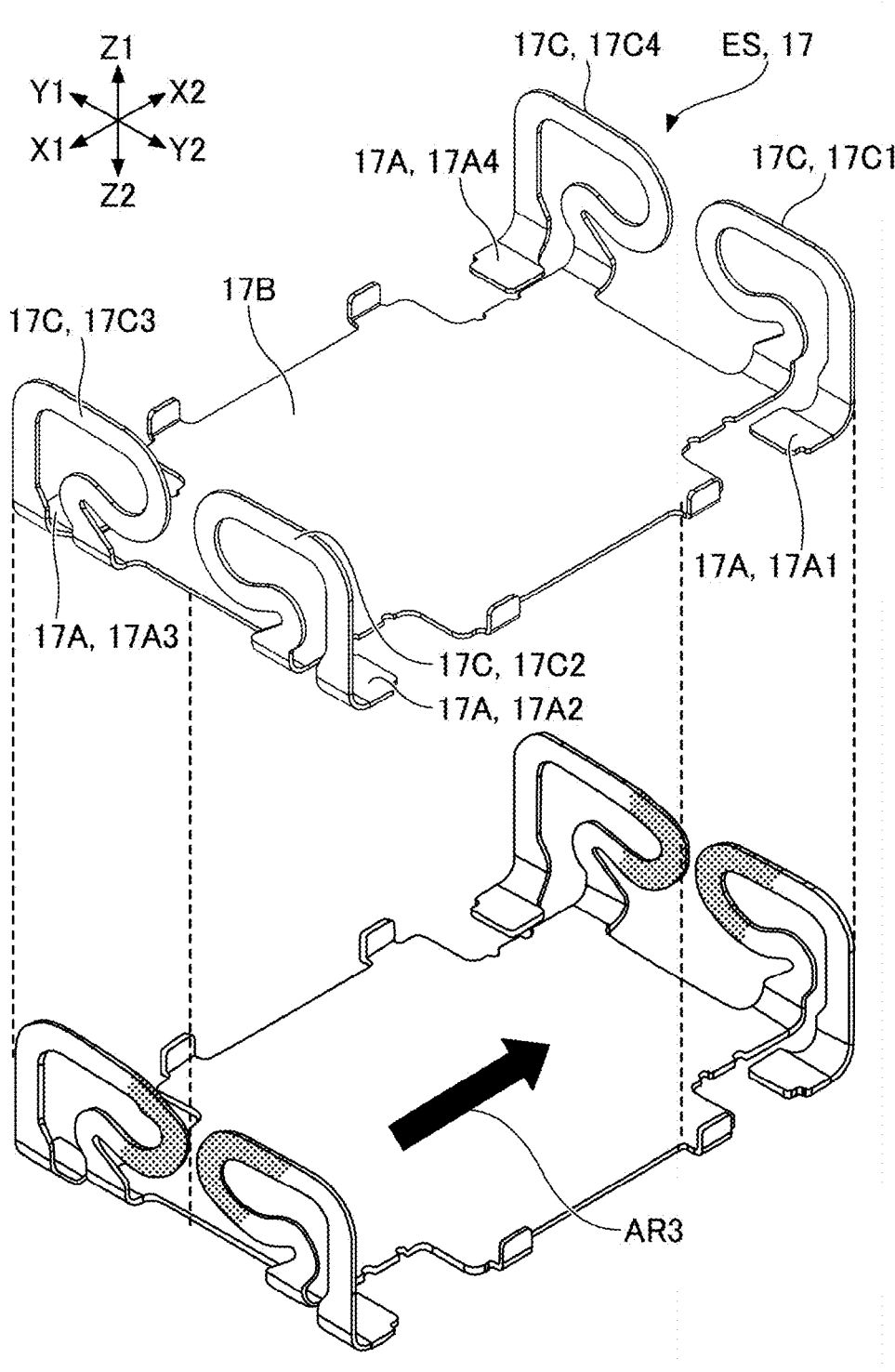
FIG. 8 is a perspective view of a leaf spring.

Next, the movement of the elastic arm 17C when the vibrating body VB vibrates will be described with reference to FIG. 8. FIG. 8 is a perspective view of the leaf spring 17. Specifically, the upper view of FIG. 8 illustrates a state of the leaf spring 17 when no current is flowing through the coil 12, i.e., when the vibrating body VB is at the neutral position (is not vibrating). The lower view of FIG. 8 illustrates a state of the leaf spring 17 when the vibrating body VB is moved to the X2 side (back side).

As illustrated in the upper view of FIG. 8, the elastic arm 17C is provided between the connection portion 17A and the vibrating body support 17B. Specifically, the first elastic arm 17C1 is provided between the first connection portion 17A1 and the vibrating body support 17B, the second elastic arm 17C2 is provided between the second connection portion 17A2 and the vibrating body support 17B, the third elastic arm 17C3 is provided between the third connection portion 17A3 and the vibrating body support 17B, and the fourth elastic arm 17C4 is provided between the fourth connection portion 17A4 and the vibrating body support 17B.

When the vibrating body VB (not illustrated in FIG. 8) is moved by the driver DM in a direction indicated by an arrow AR3, the elastic arm 17C deflects as illustrated in the lower view of FIG. 8, thereby enabling the translation of the vibrating body VB in an X2 direction. In FIG. 8, for clarification, a portion of the elastic arm 17C exhibiting relatively large deflection is provided with a dot pattern.

Meanwhile, when the vibrating body VB is moved by the driver DM in an X1 direction opposite to the X2 direction indicated by the arrow AR3, the elastic arm 17C deflects in a direction opposite to the deflection direction as illustrated in the lower view of FIG. 8, thereby enabling the translation of the vibrating body VB in the X1 direction.

Here, details of the upper yoke 10U will be described with reference to FIG. 3. The upper yoke 10U includes the top plate TW, the right-hand plate RW, and the left-hand plate LW. Specifically, the left-hand plate LW extending in a Z2 direction is formed at the end of the top plate TW on the Y1 side, and the right plate RW extending in the Z2 direction is formed at the end of the top plate TW on the Y2 side. Also, the projections PR are formed at the lower ends of the left-hand plate LW and the right-hand plate RW so as to be engaged with the recesses RC formed at the lower yoke 10D. The upper view of FIG. 6 illustrates a state in which the projections PR of the upper yoke 10U are engaged with the recesses RC formed at the lower yoke 10D.

When assembling the vibrating body VB, the upper magnet 15U is attached to the top plate TW (see FIG. 3) of the upper yoke 10U, the lower magnet 15D is attached to the bottom plate BW (see FIG. 3) of the lower yoke 10D, and the projections PR of the upper yoke 10U are engaged with the recesses RC of the lower yoke 10D. Thus, in the present embodiment, the upper yoke 10U and the lower yoke 10D that enclose the magnet 15 are separate members so as to simplify assembly of the vibrating body VB.

As illustrated in the upper view of FIG. 6, the Z1-side (upper-side) surface of the upper magnet 15U is bonded with a magnetic force to the Z2-side (lower-side) surface of the top plate TW of the upper yoke 100, and the Z2-side (lower-side) surface of the lower magnet 15D is bonded with a magnetic force to the Z1-side (upper-side) surface of the bottom plate BW of the lower yoke 10D. In the space enclosed by the upper yoke 10U and the lower yoke 10D, as illustrated in the lower view of FIG. 6, the coil 12 fixed to the bracket 11 is disposed on the Z2 side of the upper magnet 150 and on the Z1 side of the lower magnet 15D in a state in which the coil 12 is not in contact with the upper magnet 15U and the lower magnet 15D.

Figure 9:
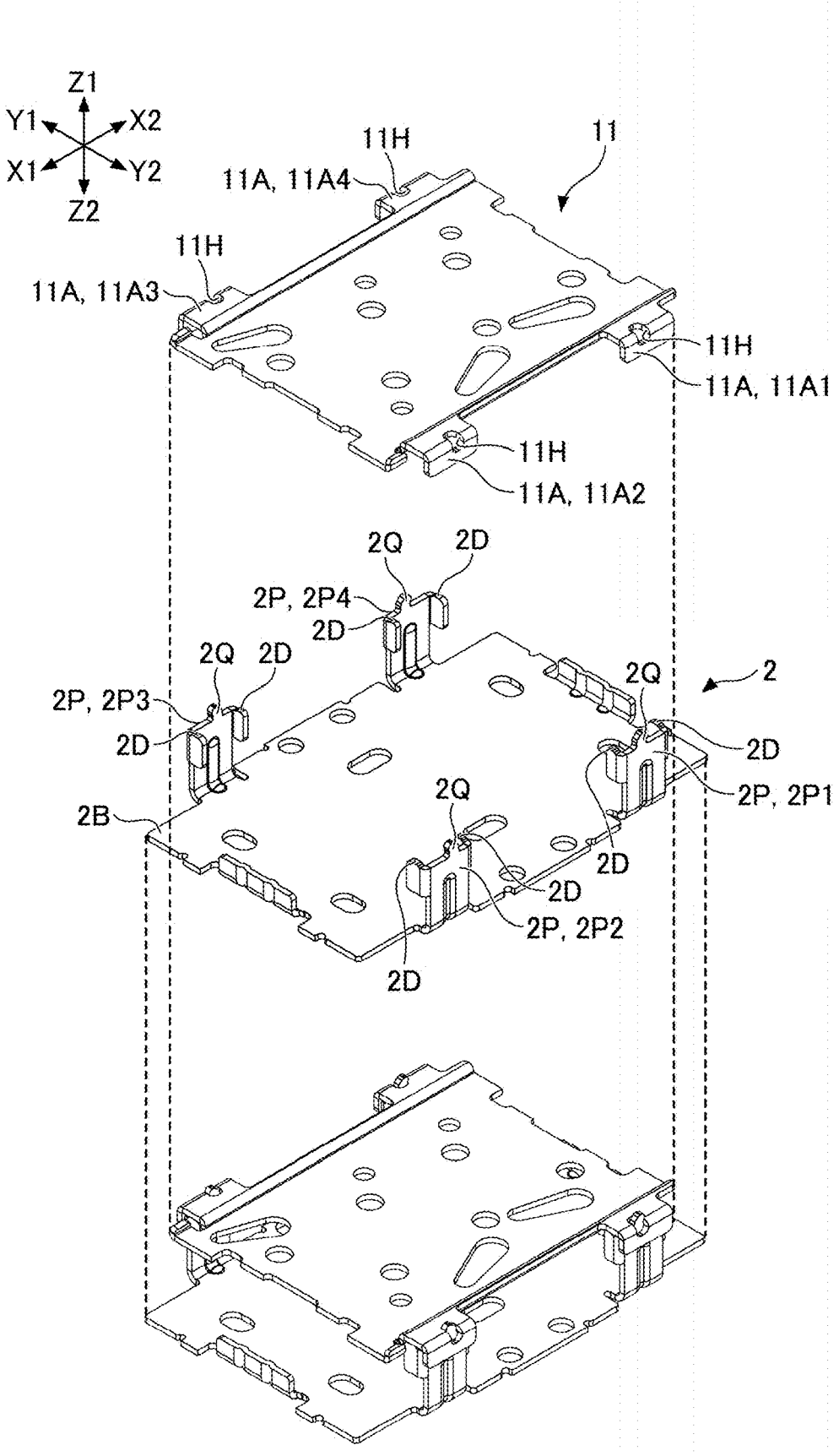
FIG. 9 is a perspective view of a base member and a bracket.

As illustrated in FIG. 9, the bracket 11 is attached to the base member 2 by engaging an attachment plate 11A, provided at the bracket 11, with an attachment plate support 2P, provided at the base member 2. FIG. 9 is a view illustrating configuration examples of the base member 2 and the bracket 11. Specifically, the upper view of FIG. 9 is a perspective view of the bracket 11, the middle view of FIG. 9 is a perspective view of the base member 2, and the lower view of FIG. 9 is a perspective view of the bracket 11 attached to the base member 2.

As illustrated in FIG. 9, the attachment plate 11A includes a first attachment plate 11A1 to a fourth attachment plate 11A4. The attachment plate support 2P includes a first attachment plate support 2P1 to a fourth attachment plate support 2P4. The first attachment plate 11A1 is engaged with the first attachment plate support 2P1, the second attachment plate 11A2 is engaged with the second attachment plate support 2P2, the third attachment plate 11A3 is engaged with the third attachment plate support 2P3, and the fourth attachment plate 11A4 is engaged with the fourth attachment plate support 2P4. Specifically, a through-hole 11H is formed in each of the first attachment plate 11A1 to the fourth attachment plate 11A4, and a projection 20 projecting upward is formed at each of the first attachment plate support 2P1 to the fourth attachment plate support 2P4. The engagement between the first attachment plate 11A1 and the first attachment plate support 2P1 is achieved in a state in which the lower surface of the first attachment plate 11A1 is contacted with two projecting supports 2D of the first attachment plate support 2P1, and the projection 20 of the first attachment plate support 2P1 is inserted into the through-hole 11H in the first attachment plate 11A1. The same applies to the engagement between the second attachment plate 11A2 and the second attachment plate support 2P2, the engagement between the third attachment plate 11A3 and the third attachment plate support 2P3, and the engagement between the fourth attachment plate 11A4 and the fourth attachment plate support 2P4. Details of the engagement between the attachment plate 11A and the housing HS will be described below.

Figure 10:
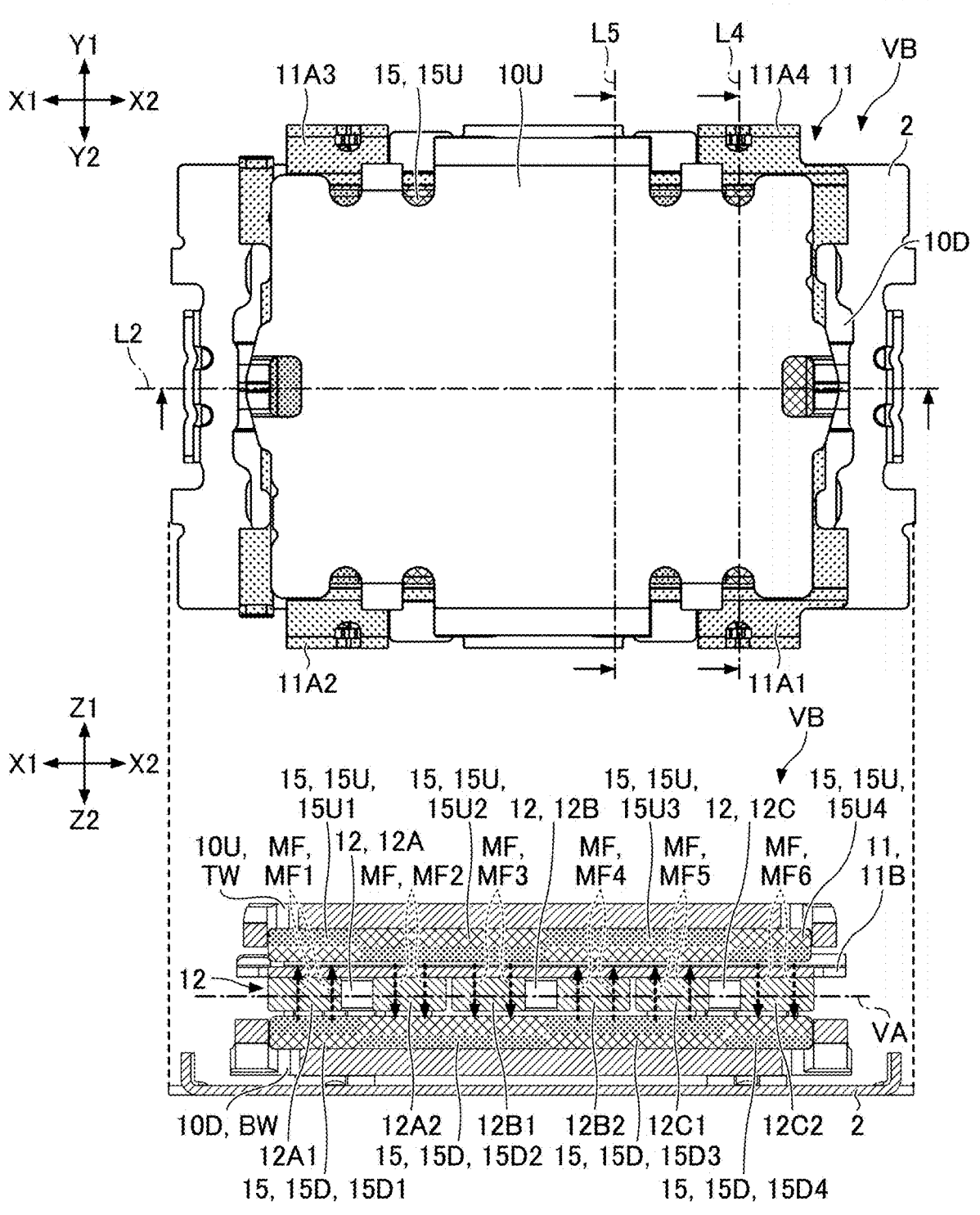
FIG. 10 is a top plan view and a cross-sectional view of the base member, the bracket, a coil, and a vibrating body.

Next, the magnetic flux generated by the magnet 15 will be described with reference to FIG. 10. FIG. 10 is a view illustrating configuration examples of the base member 2, the bracket 11, the coil 12, and the vibrating body VB. Specifically, the upper view of FIG. 10 is a top plan view of the base member 2, the bracket 11, and the vibrating body VB. In the upper view of FIG. 10, for clarification, the bracket 11 is provided with a dot pattern. The lower view of FIG. 10 is a cross-sectional view of the base member 2, the bracket 11, the coil 12, and the vibrating body VB. Specifically, the lower view of FIG. 10 is a cross-sectional view, as seen from the Y2 side, of the base member 2, the bracket 11, the coil 12, and the vibrating body VB in an imaginary plane parallel to an XZ plane including a dash-dot line L2 in the upper view of FIG. 10. More specifically, the lower view of FIG. 10 illustrates: the vibrating body VB including the upper yoke 10U, the upper magnet 15U, the lower magnet 15D, and the lower yoke 10D; and the coil 12 disposed in a space enclosed by the upper yoke 10U and the lower yoke 10D (a space between the upper magnet 15U and the lower magnet 15 D). The magnet 15 generates a magnetic flux represented by magnetic field lines MF denoted by dotted lines in the lower view of FIG. 10. In the example as illustrated in the lower view of FIG. 10, the magnetic field lines MF include a first magnetic field line MF1 to a sixth magnetic field line MF6.

Specifically, in a state in which no current flows through the coil 12, the first magnetic field line MF1 exits the N-pole portion of the first lower magnet portion 15D1 of the lower magnet 15D, passes through the forward main wire bundle 12A1 of the first coil-wound portion 12A, and enters the S-pole portion of the first upper magnet portion 15U1 of the upper magnet 150. The second magnetic field line MF2 exits the N-pole portion of the second upper magnet portion 1502 of the upper magnet 150, passes through the backward main wire bundle 12A2 of the first coil-wound portion 12A, and enters the S-pole portion of the second lower magnet portion 15D2 of the lower magnet 15D. The third magnetic field line MF3 exits the N-pole portion of the second upper magnet portion 1502 of the upper magnet 15U, passes through the forward main wire bundle 12B1 of the second coil-wound portion 12B, and enters the S-pole portion of the second lower magnet portion 15D2 of the lower magnet 15D. The fourth magnetic field line MF4 exits the N-pole portion of the third lower magnet portion 15D3 of the lower magnet 15D, passes through the backward main wire bundle 12B2 of the second coil-wound portion 12B, and enters the S-pole portion of the third upper magnet portion 1503 of the upper magnet 15U. The fifth magnetic field line MF5 exits the N-pole portion of the third lower magnet portion 15D3 of the lower magnet 15D, passes through the forward main wire bundle 12C1 of the third coil-wound portion 12C, and enters the S-pole portion of the third upper magnet portion 1503 of the upper magnet 15U. The sixth magnetic field line MF6 exits the N-pole portion of the fourth upper magnet portion 15U4 of the upper magnet 15U, passes through the backward main wire bundle 12C2 of the third coil-wound portion 12C, and enters the S-pole portion of the fourth lower magnet portion 15D4 of the lower magnet 15D.

Therefore, in the space enclosed by the upper yoke 10U and the lower yoke 10D, the magnetic field lines are densified in a partial space between the upper magnet 15U and the lower magnet 15D, and the magnetic flux density is high. The coil 12 is disposed in this partial space. Therefore, with this configuration, by passing a current between the first end 12S and the second end 12E of the coil 12, it is possible to efficiently generate a Lorentz force and efficiently vibrate the vibrating body VB along the X-axis direction.

For example, when a current flows from the first end 12S to the second end 12E of the coil 12, the vibrating body VB moves to the X2 side (back side). When a current flows from the second end 12E to the first end 12S of the coil 12, the vibrating body VB moves to the X1 side (front side). Therefore, the controller CTR can vibrate the vibrating body VB along the vibration axis VA by passing a current through the coil 12 such that the direction of the current is alternately reversed. The bracket 11, to which the coil 12 is attached, is fixed to the base member 2 and is not fixed to the vibrating body VB. Thus, the bracket 11 and the coil 12 do not vibrate together with the vibrating body VB.

When the vibrating body VB vibrates along the vibration axis VA, the magnetic flux generated to extend in a Z-axis direction between the upper magnet 15U and the lower magnet 15D included in the vibrating body VB (hereinafter referred to as "effective magnetic flux") also vibrates along the vibration axis VA. That is, the effective magnetic flux traversing the bracket 11 serving as a conductive member between the upper magnet 150 and the lower magnet 15D vibrates along the vibration axis VA while maintaining to traverse the bracket 11. Therefore, an eddy current flows through the main plate 11B of the bracket 11. In the illustrated example, the upper magnet 15U, the lower magnet 15D, and the bracket 11 are disposed such that the effective magnetic flux and the main plate 11B are orthogonal to each other.

The vibrating body VB always receives a braking force generated in a direction opposite to the vibration direction, a force attributed to the eddy current. Specifically, the vibrating body VB is vibrated by the Lorentz force generated by the driver DM, and receives the braking force working to decelerate the vibration. The braking force increases in proportion to the vibration speed of the vibrating body VB. Therefore, the vibration acceleration at the natural frequency of the vibrating body VB and at frequencies in the vicinity thereof is reduced by the action of the braking force.

The braking force attributed to the eddy current increases as the eddy current increases. Also, the eddy current increases as the specific resistance of the conductive member (bracket 11) decreases, the eddy current increases as the conductivity of the conductive member (bracket 11) increases, and the eddy current increases as the thickness of the conductive member (bracket 11) (the thickness of the main plate 11B) increases. Therefore, the material and thickness of the bracket 11 are selected so as to obtain a desired braking force. In the illustrated example, the bracket 11 is formed of tough-pitch copper, the same material as that of the wire of the coil 12, and has a thickness of about 0.3 mm (millimeters).

With this configuration, the vibration generating device 101 can increase durability thereof compared to a case in which a viscoelastic member configured to generate a braking force is attached between the vibrating body VB and the non-vibrating body NV. This is because the viscoelastic member is prone to influences of ambient temperature, dimensional variation, degradation, delamination, tearing, and the like, while the bracket 11 is not prone to these influences.

The bracket 11 is formed to have a plurality of openings (three first openings H1, three second openings H2, and six third openings H3) as illustrated in the upper view of FIG. 4. At least one of the openings may be a cut-out portion.

The first openings H1 are each a non-circular opening (an approximately teardrop-shaped opening). The first openings H1 are for preventing tilting of the upper surface of the coil 12 with respect to the lower surface of the main plate 11B due to interference between the main plate 11B and the conductor portion CP occurring when the coil 12 is attached to the lower surface of the main plate 11B of the bracket 11.

The second openings H2 are each an approximately circular opening that receives an unillustrated jig configured to position the hollow core AC of the coil 12. The unillustrated jig is, for example, a cylindrical rod member. In the illustrated example, the first opening H1 also functions as an opening that receives that jig.

The third openings H3 are each an approximately circular opening formed to receive a jig configured to maintain an appropriate clearance between the bracket 11 and the coil 12 upon applying an adhesive between the lower surface of the main plate 11B of the bracket 11 and the upper surface of the coil 12.

In the illustrated example, the first opening H1 to the third opening H3 are formed at positions that avoid a trajectory TR. The trajectory TR is a trajectory on the main plate 11B followed by the center axis of the effective magnetic flux occurring when the vibrating body VB is vibrating. That is, the vibration generating device 101 is configured such that the center axis of the effective magnetic flux extending along the Z-axis direction moves along the linear trajectory TR in the X-axis direction. In the illustrated example, the center axis of the effective magnetic flux includes the center axis of the effective magnetic flux generated by each of the first lower magnet portion 15D1, the second upper magnet portion 15U2, the third lower magnet portion 15D3, and the fourth upper magnet portion 1504 as indicated by the magnetic field lines MF in FIG. 10. The trajectory TR is located on the vibration axis VA in a top plan view. The center axis of the effective magnetic flux may be read instead as a coil axis of each of the first coil-wound portion 12A, the second coil-wound portion 12B, and the third coil-wound portion 12C.

In other words, the first openings H1 to the third openings H3 are all formed at positions that avoid a center region CR. The center region CR is a region that is located at the center portion of the main plate 11B and includes the trajectory TR. Specifically, the center region CR is a region in which an eddy current flows that is generated by: the effective magnetic flux generated by the magnet 15; and the conductive member (bracket 11) disposed to traverse the effective magnetic flux. In the upper view of FIG. 4, for clarification, the center region CR is provided with a dot pattern.

In the illustrated example, no openings, such as the first openings H1 to the third openings H3, are formed in the rectangular center region CR of the main plate 11B. Thus, the vibration generating device 101 provides the effect that an eddy current is more likely to flow than in a case in which openings are formed in the center region CR. Also, the rectangular center region CR of the main plate 11B is flat, i.e., does not include any recesses, projections, or the like. Thus, the vibration generating device 101 provides the effect that an eddy current is more likely to flow than in a case in which the rectangular center region CR is not flat due to the presence of recesses, projections, or the like.

In a top plan view, the center region CR is bilaterally symmetric with respect to the vibration axis VA, and is forward-backward symmetric with respect to a line segment L1 (see the upper view of FIG. 4) representing a left-right axis passing through the center point of the bracket 11. This configuration provides the effect that the magnitude of the braking force occurring when the vibrating body VB moves forward (in the X1 direction) becomes the same as the magnitude of the braking force occurring when the vibrating body VB moves backward (in the X2 direction).

Figure 11:
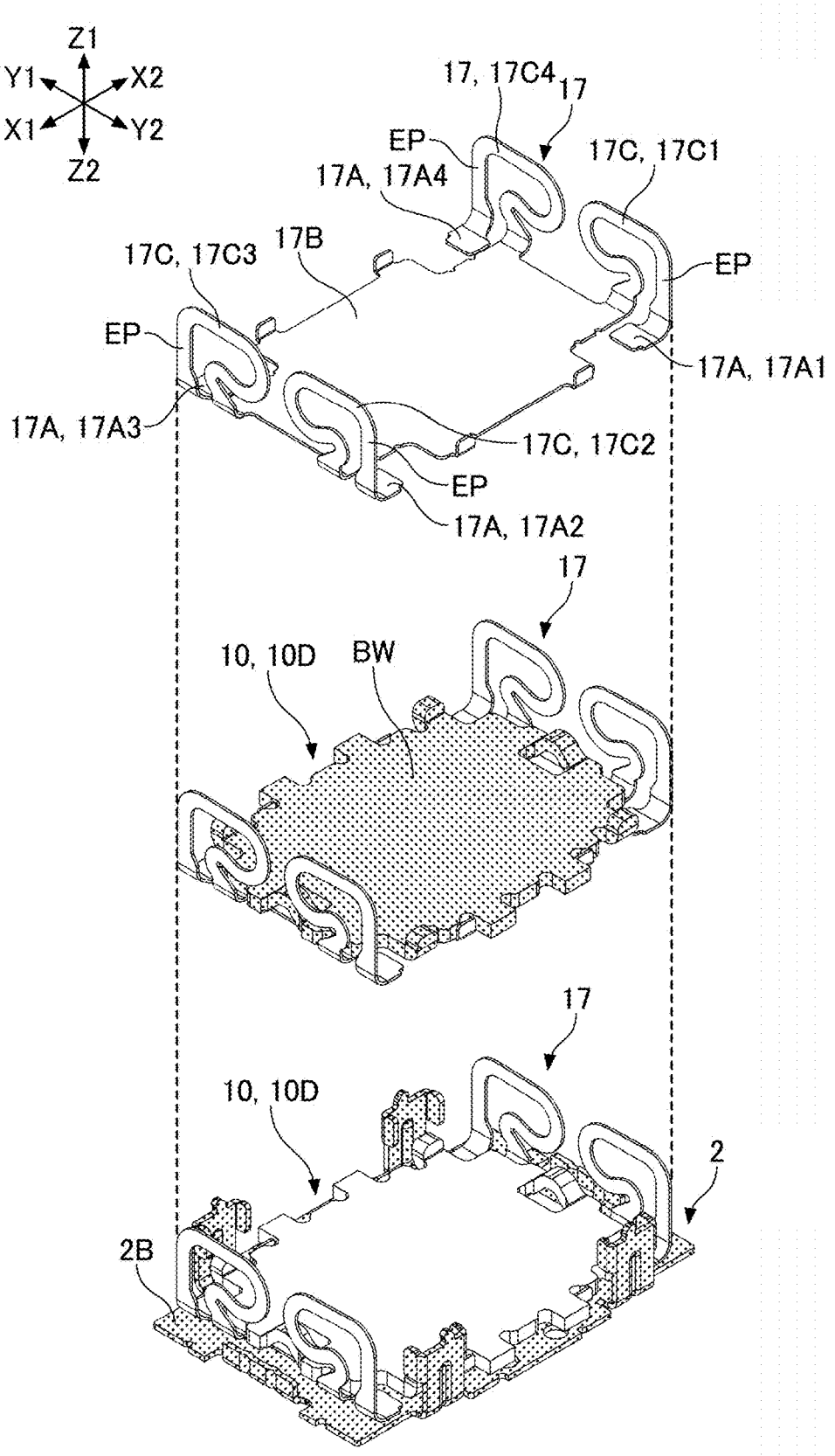
FIG. 11 is a perspective view of members forming the vibration generating device.
Figure 12:
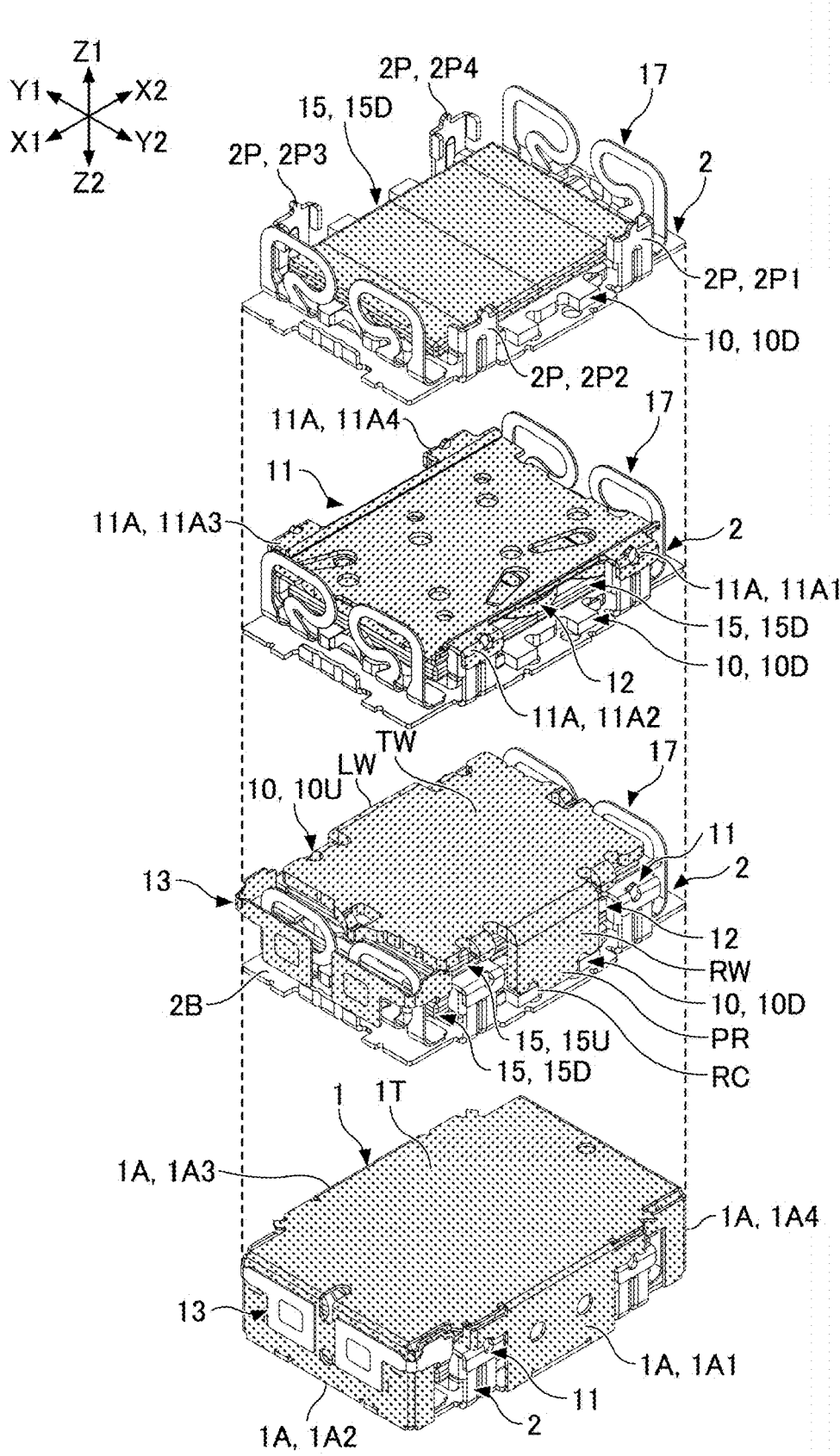
FIG. 12 is a perspective view of the members forming the vibration generating device.

Next, a method for assembling the vibration generating device 101 will be described with reference to FIGS. 11 and 12. FIGS. 11 and 12 are perspective views of the members forming the vibration generating device 101. In FIGS. 11 and 12, for clarification, newly attached members are provided with a dot pattern.

Specifically, the upper view of FIG. 11 is a perspective view of the leaf spring 17. The middle view of FIG. 11 is a perspective view of the leaf spring 17 to which the lower yoke 10D is attached. The lower view of FIG. 11 is a perspective view of the base member 2 to which the leaf spring 17 in the state as illustrated in the middle view of FIG. 11 is attached.

The uppermost view of FIG. 12 is a perspective view of the base member 2 to which the lower magnet 15D is further attached. The second uppermost view of FIG. 12 is a perspective view of the base member 2 to which the bracket 11 and the coil 12 are further attached. The third uppermost view of FIG. 12 is a perspective view of the base member 2 to which the upper magnet 150, the upper yoke 10U and the wiring board 13 are further attached. The lowermost view of FIG. 12 is a perspective view of the base member 2 to which the cover member 1 is further attached, i.e., a perspective view of the vibration generating device 101.

First, the lower yoke 10D is stacked on the upper surface of the vibrating body support 17B of the leaf spring 17, as illustrated in the middle view of FIG. 11. In the illustrated example, the bottom plate BW of the lower yoke 10D is stacked on the upper surface of the vibrating body support 17B without application of an adhesive. An unillustrated damping steel plate, which is a reinforcing material configured to suppress deflection of an upright portion EP, may be attached to the outer surface of the upright portion EP of the elastic arm 17C of the leaf spring 17.

Subsequently, the leaf spring 17, on which the lower yoke 10D is stacked, is disposed on the upper surface of the bottom plate 2B of the base member 2, as illustrated in the lower view of FIG. 11. The lower yoke 10D and the leaf spring 17 are bonded together, and the base member 2 and the leaf spring 17 are bonded together. In the illustrated example, the bottom plate BW of the lower yoke 10D is bonded to the upper surface of the vibrating body support 17B of the leaf spring 17 through laser welding, and the connection portion 17A of the leaf spring 17 is bonded to the upper surface of the bottom plate 2B of the base member 2 through laser welding.

Subsequently, the lower magnet 15D is stacked on the upper surface of the bottom plate BW of the lower yoke 10D, as illustrated in the uppermost view of FIG. 12. In the illustrated example, the lower yoke 10D and the lower magnet 15D are attracted to each other by the action of a magnetic force. Thus, bonding therebetween through laser welding is not performed, and bonding therebetween with an adhesive is not performed. However, the lower yoke 10D and the lower magnet 15D may be bonded together through laser welding or with an adhesive.

Subsequently, the non-vibrating body NV is attached to the base member 2 as illustrated in the second uppermost view of FIG. 12. In the illustrated example, the non-vibrating body NV includes the bracket 11, the coil 12, and the wiring board 13. Before the non-vibrating body NV is attached to the base member 2, the coil 12 is bonded to the bracket 11 with an adhesive, and the wiring board 13 is bonded to the bracket 11 with a piece of double-sided tape.

Subsequently, the upper yoke 10U, to which the upper magnet 15U is attached, is bonded to the lower yoke 10D at a position that does not contact the non-vibrating body NV, as illustrated in the third uppermost view of FIG. 12. Specifically, the upper yoke 10U and the lower yoke 10D are bonded together, through welding, with an adhesive, or the like, at portions in which the projections PR of the upper yoke 10U are engaged with the recesses RC formed at the lower yoke 10D. In the illustrated example, the upper yoke 10U and the lower yoke 10D are bonded together through laser welding.

Before the upper yoke 10U is bonded to the lower yoke 10D, the upper magnet 15U is stacked on the lower surface of the top plate TW of the upper yoke 10U like the lower magnet 15D is stacked on the upper surface of the bottom plate BW of the lower yoke 10D. The upper yoke 10U and the upper magnet 15U are attracted to each other by the action of a magnetic force, and thus bonding therebetween through laser welding is not performed, and bonding therebetween with an adhesive is not performed. However, the upper yoke 10U and the upper magnet 15U may be bonded together through laser welding or with an adhesive.

Subsequently, as illustrated in the lowermost view of FIG. 12, the cover member 1 is attached to cover the members other than the base member 2 and the wiring board 13. In the illustrated example, the lower end of the outer peripheral wall portion 1A of the cover member 1 is bonded through laser welding to the peripheral edge of the bottom plate 2B of the base member 2. The cover member 1 and the base member 2 may be bonded to each other with a fastening member, an adhesive, caulking, or the like.

In this manner, the vibration generating device 101 is assembled. The adhesive used in the above-described assembling process may be, for example, a thermosetting adhesive, a photocurable adhesive, a moisture-curable adhesive, or a hybrid adhesive that is a combination thereof. In the illustrated example, the adhesive is a thermosetting adhesive.

Figure 13:
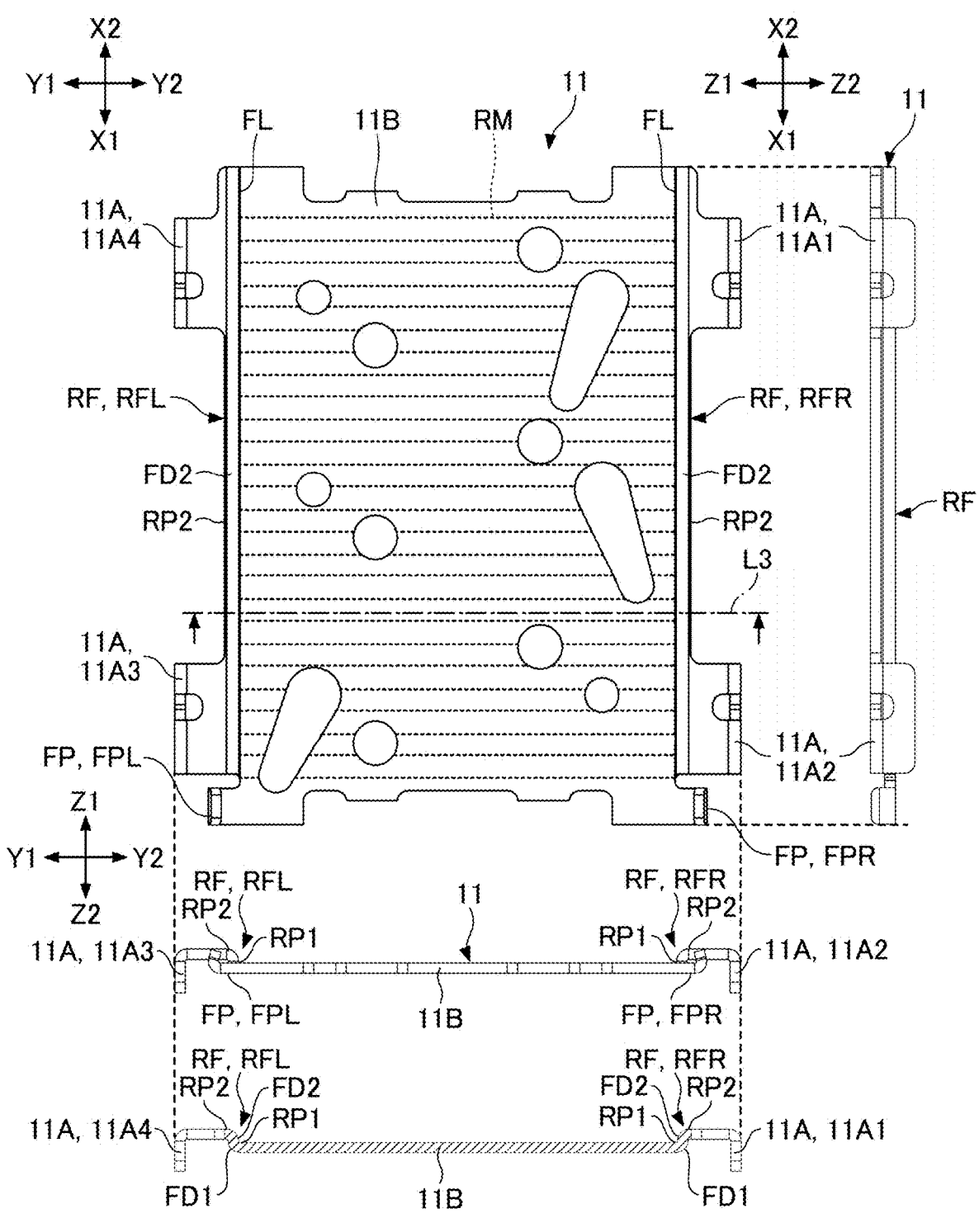
FIG. 13 is a view of three sides of the bracket and a cross-sectional view of the bracket.

Next, details of a reinforced structure of the bracket 11 will be described with reference to FIG. 13. FIG. 13 is a view of three sides of the bracket 11 (top plan view, front view, and right-hand side view) and a cross-sectional view of the bracket 11. Specifically, the lowermost view of FIG. 13 is a view, as seen from the X1 side, of a cross section of the base member 2 in an imaginary plane parallel to a YZ plane including a dash-dot line L3 in the top plan view of FIG. 13.

In the illustrated example, the bracket 11 is formed of a rolled copper plate. Therefore, the bracket 11 has roll streaks (roll marks RM). Dashed lines on the upper surface of the main plate 11B of the bracket 11 in FIG. 13 represent the roll marks RM.

Also, a reinforcing portion RF is formed on both of the left and right ends of the main plate 11B. In the illustrated example, the reinforcing portion RF is a portion subjected to what is called Z-bending (step bending), and a bend line FL below the reinforcing portion RF is perpendicular to the roll marks RM. Specifically, a left-hand reinforcing portion RFL is formed at the left-hand end of the main plate 11B, and a right-hand reinforcing portion RFR is formed at the right-hand end of the main plate 11B.

As illustrated in the cross-sectional view, the left-hand reinforcing portion RFL includes a first bending portion FD1, a second bending portion FD2, a first reinforcing plate RP1, and a second reinforcing plate RP2. The first bending portion FD1 is bent upward from the left-hand end of the main plate 11B. The first reinforcing plate RP1 extends upward from the upper end of the first bending portion FD1. The second bending portion FD2 is bent leftward from the upper end of the first reinforcing plate RP1. The second reinforcing plate RP2 extends leftward from the left-hand end of the second bending portion FD2. The same applies to the right-hand reinforcing portion RFR.

As illustrated in FIG. 13, the attachment plate 11A extends outward of the outer end of the second reinforcing plate RP2. Specifically, a first attachment plate 11A1 is formed to extend rightward from the right-hand back end of the second reinforcing plate RP2 of the right-hand reinforcing portion RFR, and a second attachment plate 11A2 is formed to extend rightward from the right-hand front end of the second reinforcing plate RP2 of the right-hand reinforcing portion RFR. Similarly, a third attachment plate 11A3 is formed to extend leftward from the left-hand front end of the second reinforcing plate RP2 of the left-hand reinforcing portion RFL, and a fourth attachment plate 11A4 is formed to extend leftward from the left-hand back end of the second reinforcing plate RP2 of the left-hand reinforcing portion RFL.

Also, the bracket 11 includes a base FP on both sides of the front end thereof. The base FP is configured to place thereon the inner conductor pattern P1 of the wiring board 13 (see the lower view of FIG. 4). Specifically, the bracket 11 includes: a left-hand base FPL configured to place thereon the inner conductor pattern P1 of the left-hand wiring board 13L; and a right-hand base FPR configured to place thereon the inner conductor pattern P1 of the right-hand wiring board 13R.

Figure 14:
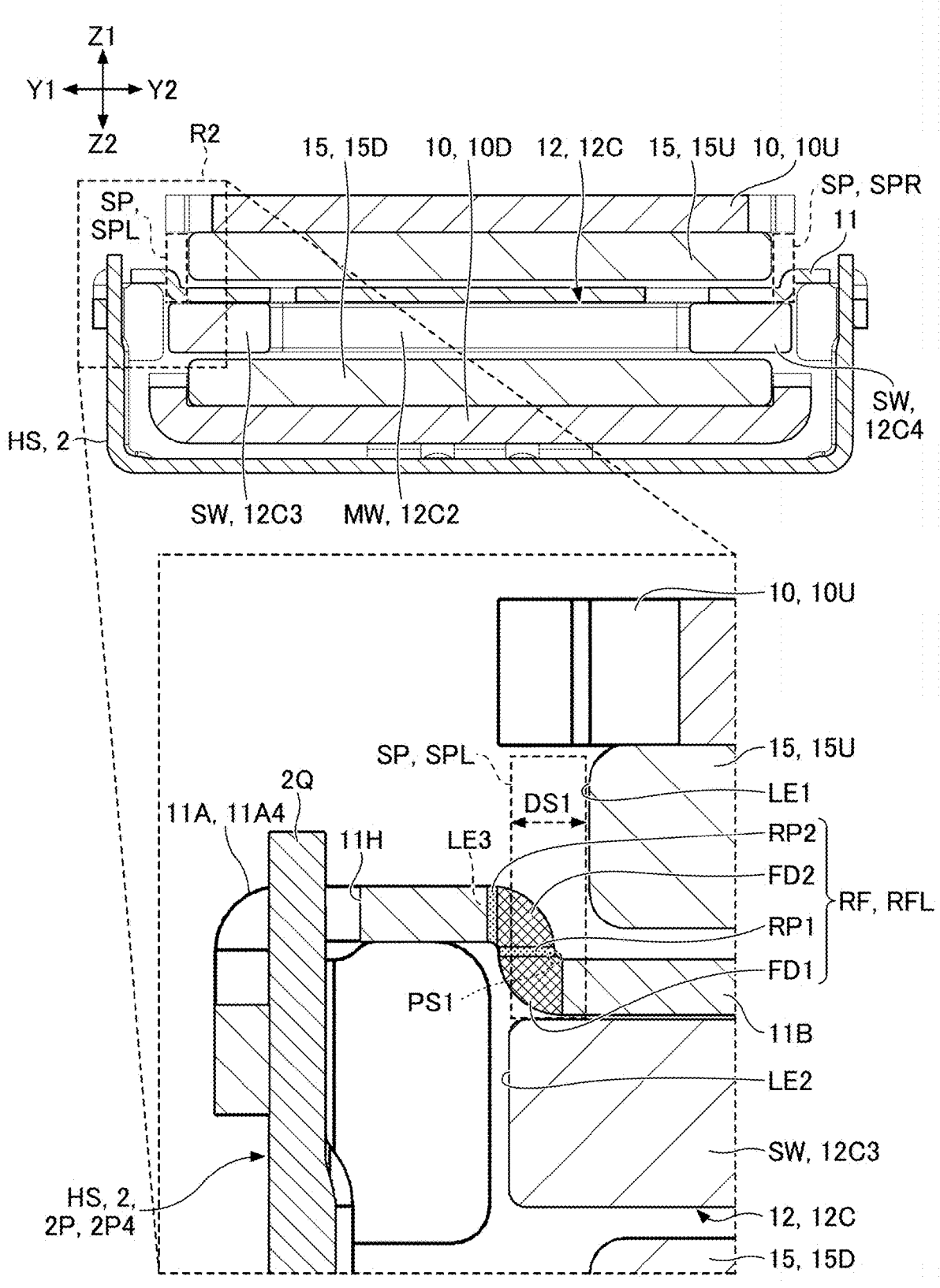
FIG. 14 is a cross-sectional view of the base member, the bracket, the coil, and the vibrating body.

Next, a positional relationship between the base member 2, the yoke 10, the bracket 11, the coil 12, and the magnet 15 will be described with reference to FIG. 14. FIG. 14 is a cross-sectional view of the base member 2, the yoke 10, the bracket 11, the coil 12, and the magnet 15. Specifically, the upper view of FIG. 14 is a view, as seen from the X1 side, of a cross section of the members in an imaginary plane parallel to the YZ plane including a dash-dot line L4 in the upper view of FIG. 10. The lower view of FIG. 14 is an enlarged view of a range R2 enclosed by a dashed line in the upper view of FIG. 14. In the lower view of FIG. 14, for clarification, cross sections of the first and second bending portions FD1 and FD2, forming the left-hand reinforcing portion RFL, are provided with a cross pattern, and cross sections of the first and second reinforcing plates RP1 and RP2, forming the left-hand reinforcing portion RFL, are provided with a dot pattern. The other cross sections are provided with a diagonal-line pattern representing the cross sections of metal members.

As illustrated in the lower view of FIG. 14, at least a part of the reinforcing portion RF is disposed so as to be located in a space SP. The space SP corresponds to an upper magnet 15U-free portion of a space located above the coil 12. Specifically, the space SP corresponds to an upper magnet 15U-free portion of a space located above the sub wire bundle SW of the coil 12. No permanent magnet is disposed in the space SP. This is because even if a permanent magnet is disposed, the permanent magnet cannot efficiently generate a driving force suitable for driving the vibrating body VB. Therefore, the space SP is suitable as a place in which at least a part of the reinforcing portion RF is to be disposed without reducing the driving force generated by the driver DM.

Specifically, the space SP includes: a left-hand space SPL in which at least a part of the left-hand reinforcing portion RFL is to be housed; and a right-hand space SPR in which at least a part of the right-hand reinforcing portion RFR is to be housed. As illustrated in the upper view of FIG. 14, the left-hand space SPL includes an upper magnet 15U-free portion of a space located above the left-hand sub wire bundle 12C3 of the third coil-wound portion 12C, and the right-hand space SPR includes an upper magnet 15U-free portion of a space located above the right-hand sub wire bundle 12C4 of the third coil-wound portion 12C.

With this configuration, the reinforcing portion RF is disposed in the space SP with little projection from the profile of the coil 12, in a top plan view. Therefore, this configuration provides the effect that the vibration generating device 101 is miniaturized without reducing the driving force.

Figure 15:
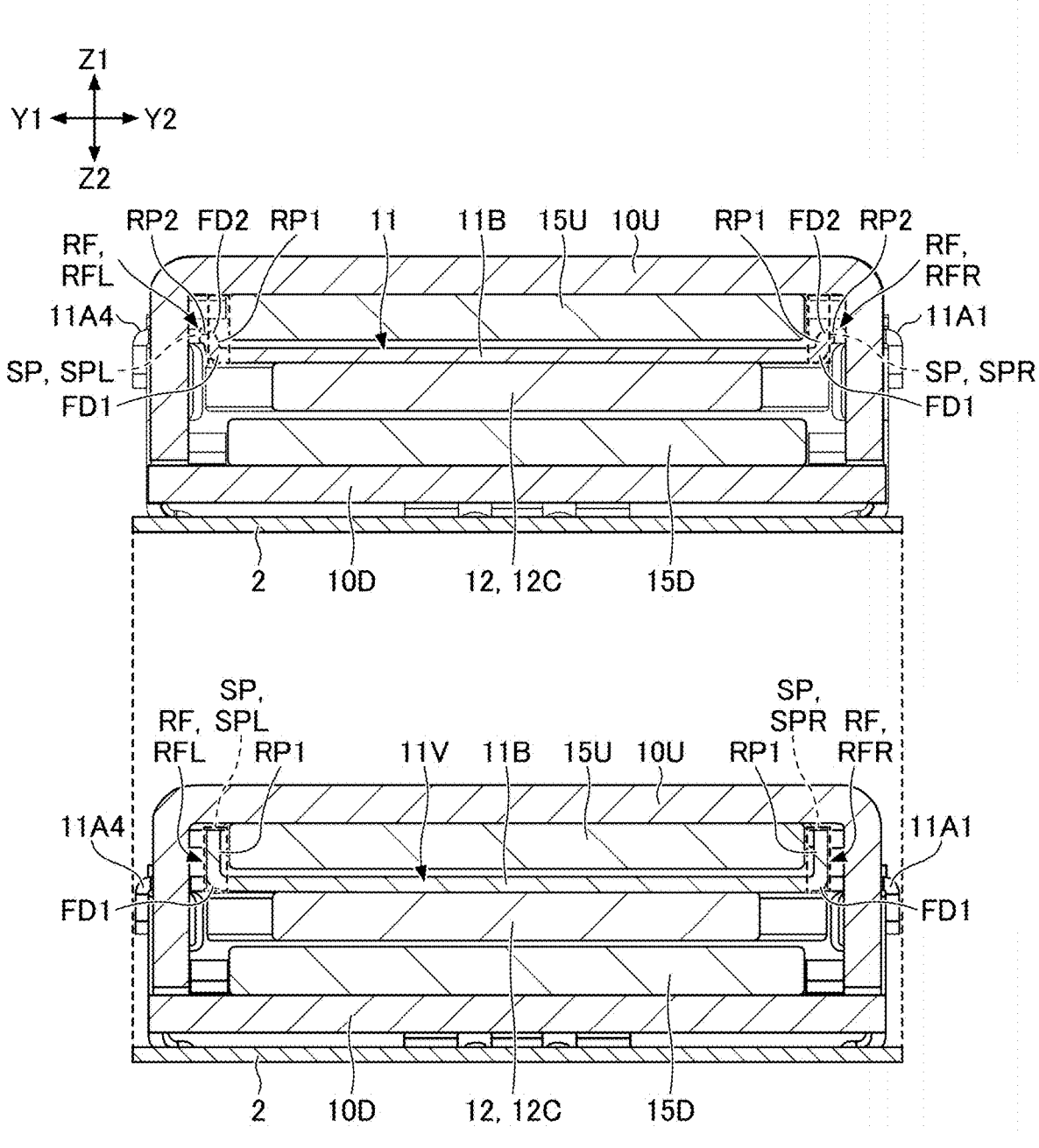
FIG. 15 is a cross-sectional view of the base member, the bracket, the coil, and the vibrating body.

Next, a bracket 11V, another configuration example of the bracket 11, will be described with reference to FIG. 15. FIG. 15 is a cross-sectional view of the base member 2, the yoke 10, the bracket 11 (bracket 11V), the coil 12, and the magnet 15. Specifically, the upper view of FIG. 15 is a view, as seen from the X1 side, of a cross section of the members in an imaginary plane parallel to the YZ plane including a dash-dot line L5 in the upper view of FIG. 10. The lower view of FIG. 15 is a cross-sectional view of the base member 2, the yoke 10, the bracket 11V, the coil 12, and the magnet 15, and corresponds to the upper view of FIG. 15. That is, the lower view of FIG. 15 corresponds to the upper view of FIG. 15 except that the bracket 11 is replaced with the bracket 11V.

The bracket 11V is different from the bracket 11 in the following point. Specifically, the bracket 11 includes the reinforcing portion RF extending approximately over the entire length of the main plate 11B in the X-axis direction, while the bracket 11V includes the reinforcing portion RF extending between the two attachment plates 11A at both ends (left-hand end and right-hand end) of the main plate 11B in the Y-axis direction. Specifically, for the bracket 11V, the right-hand reinforcing portion RFR is formed to extend between the first attachment plate 11A1 and the second attachment plate 11A2, and the left-hand reinforcing portion RFL is formed to extend between the third attachment plate 11A3 and the fourth attachment plate 11A4. That is, for the bracket 11V, no reinforcing portion is formed at the left-hand front end, the left-hand back end, the right-hand front end, and the right-hand back end of the main plate 11B. However, the bracket 11V may be formed such that the reinforcing portion RF extends approximately over the entire length of the main plate 11B in the X-axis direction.

In addition, the bracket 11V is also different from the bracket 11 in the following point. Specifically, the bracket 11 includes the first reinforcing plate RP1 extending upward to the vicinity of the lower surface (ceiling surface) of the upper yoke 10U, while the second bending portion FD2 and the second reinforcing plate RP2 are omitted in the bracket 11V.

In addition, the bracket 11V is also different from the bracket 11 in the following point. Specifically, the bracket 11 includes the attachment plate 11A extending outward of the second reinforcing plate RP2 of the reinforcing portion RF, while the bracket 11V includes the attachment plate 11A extending outward of the main plate 11B without the reinforcing portion RF. That is, for the bracket 11V, the upper surface of the attachment plate 11A and the upper surface of the main plate 11B are approximately flush with each other.

Even if the vibration generating device 101 includes the above-described bracket 11V instead of the bracket 11, the vibration generating device 101 can be miniaturized without reducing the driving force like in the case in which the vibration generating device 101 includes the bracket 11. This is because at least a part of the left-hand reinforcing portion RFL is housed in the left-hand space SPL and at least a part of the right-hand reinforcing portion RFR is housed in the right-hand space SPR. Further, the bracket 11V is readily formed compared to the bracket 11.

Figure 16:
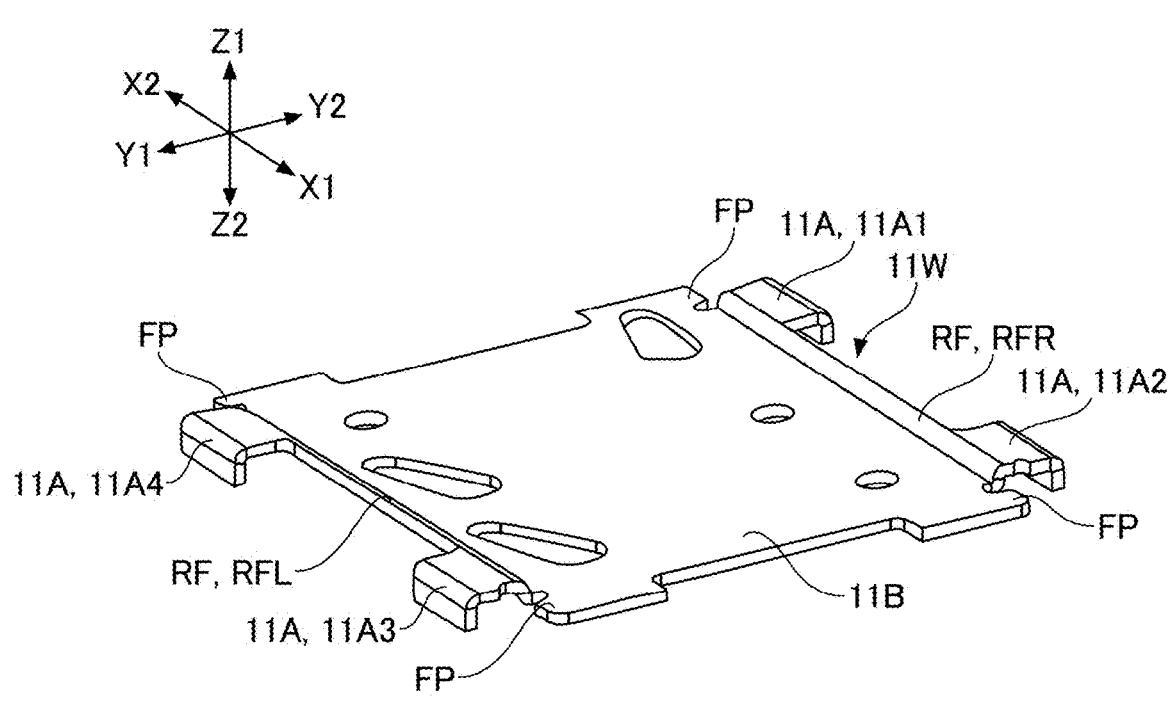
FIG. 16 is a perspective view of another configuration example of the bracket.

Next, a bracket 11W, still another configuration example of the bracket 11, will be described with reference to FIG. 16. FIG. 16 is a perspective view of the bracket 11W. The bracket 11W is the same as the bracket 11 including two bases FP except that the bracket 11W includes four bases FP and does not include the third openings H3 (see the upper view of FIG. 4).

Specifically, for the bracket 11W, the right-hand reinforcing portion RFR is formed not only so as to extend between the first attachment plate 11A1 and the second attachment plate 11A2 but also so as to be located at portions in which the first and second attachment plates 11A1 and 11A2 are disposed. Similarly, the left-hand reinforcing portion RFL is formed not only so as to extend between the third attachment plate 11A3 and the fourth attachment plate 11A4 but also so as to be located at portions in which the third and fourth attachment plates 11A3 and 11A4 are disposed. Similar to the reinforcing portions RF of the bracket 11 (see FIG. 14), the reinforcing portions RF of the bracket 11W each include the first bending portion FD1, the first reinforcing plate RP1, the second bending portion FD2, and the second reinforcing plate RP2.

Even if the vibration generating device 101 includes the above-described bracket 11W instead of the bracket 11, the vibration generating device 101 can be miniaturized without reducing the driving force like in the case in which the vibration generating device 101 includes the bracket 11. This is because at least a part of the left-hand reinforcing portion RFL is housed in the left-hand space SPL and at least a part of the right-hand reinforcing portion RFR is housed in the right-hand space SPR.

Figure 17:
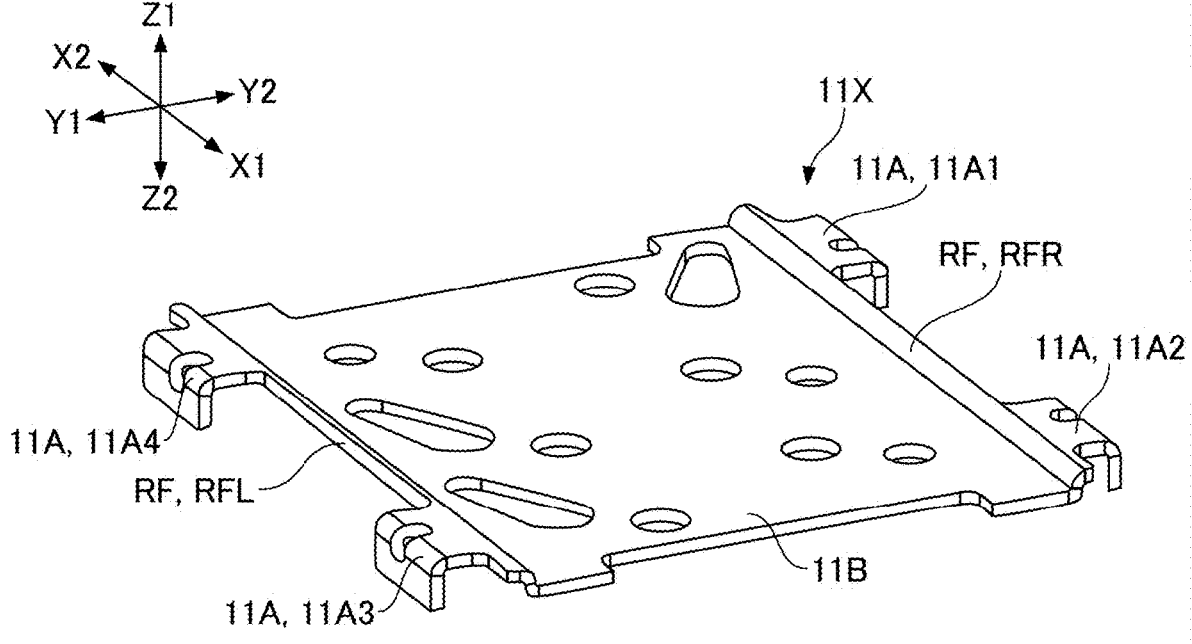
FIG. 17 is a perspective view of still another configuration example of the bracket.

Next, a bracket 11X, still another configuration example of the bracket 11, will be described with reference to FIG. 17. FIG. 17 is a perspective view of the bracket 11X. The bracket 11X is the same as the bracket 11 except that the bracket 11X includes the reinforcing portions RF (left-hand reinforcing portion RFL and right-hand reinforcing portion RFR), extending over the entire length in the X-axis direction, at both ends (left-hand end and right-hand end) of the main plate 11B in the Y-axis direction. Specifically, the left-hand reinforcing portion RFL is formed to extend over the entire length of the left-hand edge of the main plate 11B in the X-axis direction, and the right-hand reinforcing portion RFR is formed to extend over the entire length of the right-hand edge of the main plate 11B in the X-axis direction. Similar to the reinforcing portions RF of the bracket 11 (see FIG. 14), the reinforcing portions RF of the bracket 11X each include the first bending portion FD1, the first reinforcing plate RP1, the second bending portion FD2, and the second reinforcing plate RP2.

Even if the vibration generating device 101 includes the above-described bracket 11X instead of the bracket 11, the vibration generating device 101 can be miniaturized without reducing the driving force like in the case in which the vibration generating device 101 includes the bracket 11. This is because at least a part of the left-hand reinforcing portion RFL is housed in the left-hand space SPL and at least a part of the right-hand reinforcing portion RFR is housed in the right-hand space SPR.

Figure 18:
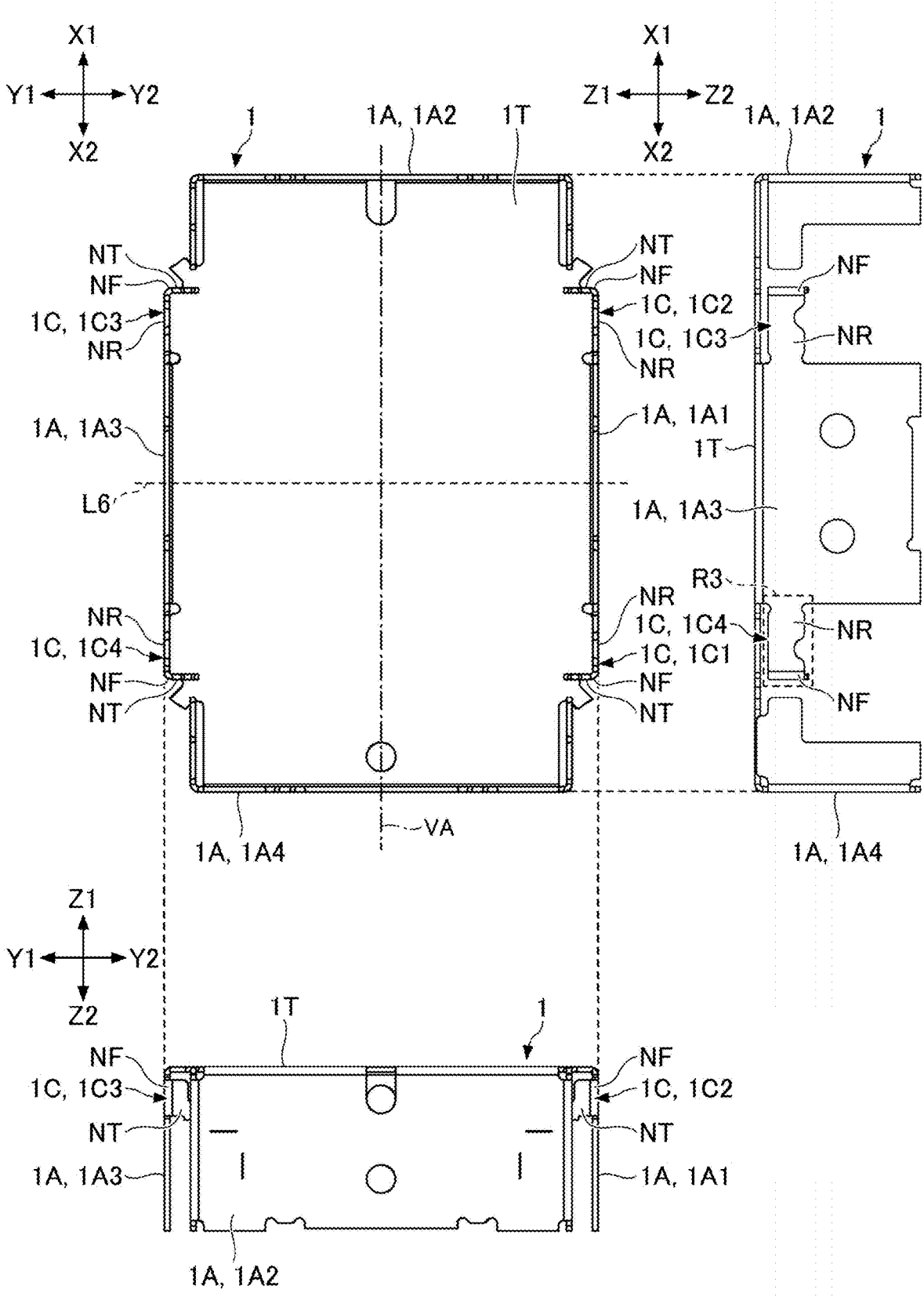
FIG. 18 is front, bottom, and left-hand side views of a cover member.
Figure 19:
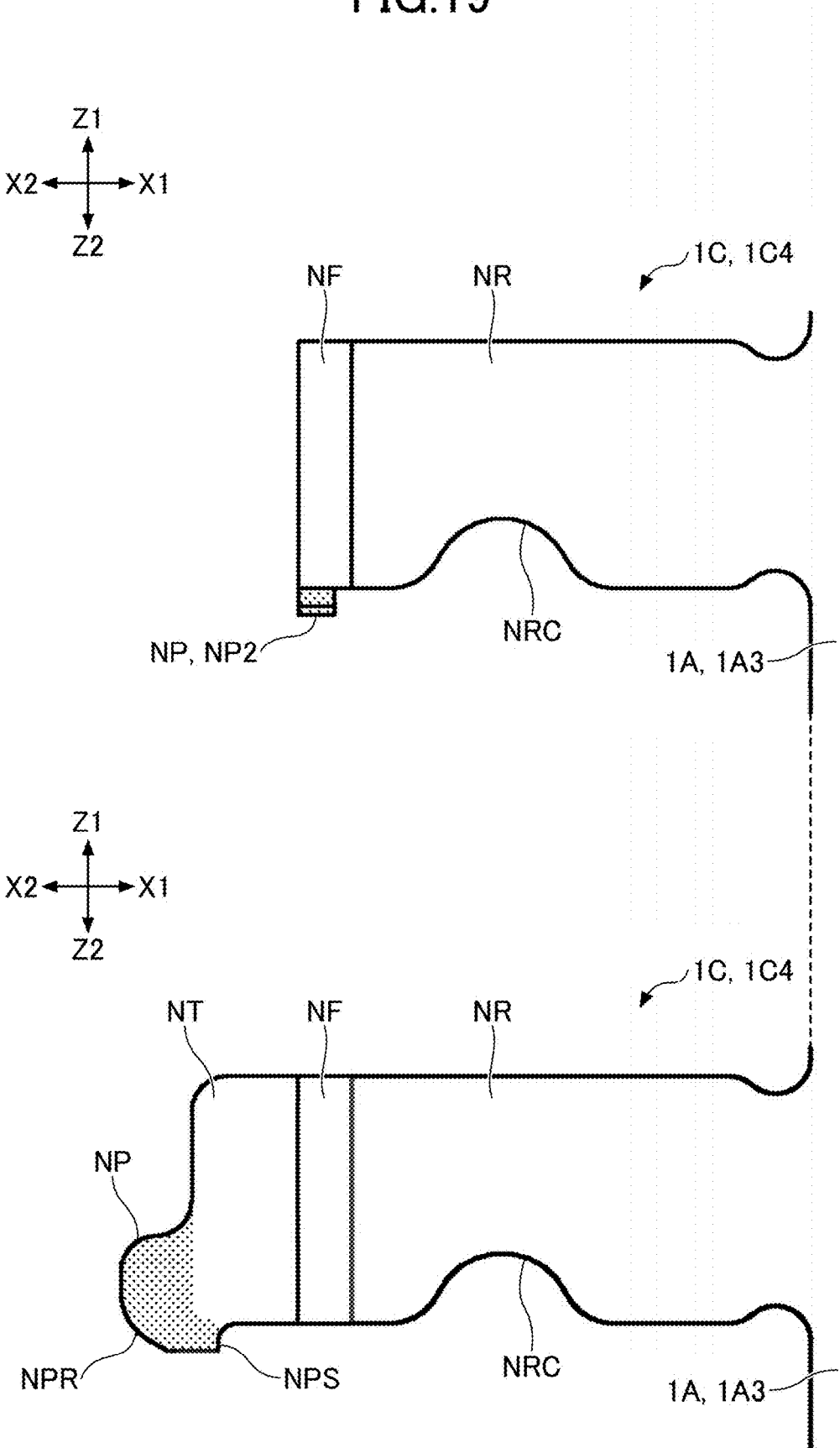
FIG. 19 is an enlarged view of a beam plate that is a part of the cover member.

Next, details of the cover member 1 will be described with reference to FIGS. 18 and 19. FIG. 18 is views seen at three different angles (front view, bottom plan view, and left-hand side view) of the cover member 1. FIG. 19 is an enlarged view of a beam plate 1C that is a part of the cover member 1. Specifically, the upper view of FIG. 19 is an enlarged view of the beam plate 1C in a range R3 enclosed by a dashed line in FIG. 18, and illustrates the beam plate 1C in a state of being bent in an L shape. The lower view of FIG. 19 is an enlarged view of the beam plate 1C corresponding to the upper view of FIG. 19, and illustrates a state in which the beam plate 1C bent in an L shape is extended so as to be straight.

The beam plate 1C that is a part of the cover member 1 is a portion to be bent inward of the cover member 1. In the illustrated example, the beam plate 1C is a cantilevered portion included in the outer peripheral wall portion 1A of the cover member 1, and includes a first beam plate 1C1 extending backward from the back edge of the first side plate 1A1, a second beam plate 1C2 extending forward from the front edge of the first side plate 1A1, a third beam plate 1C3 extending forward from the back edge of the third side plate 1A3, and a fourth beam plate 1C4 extending backward from the back edge of the third side plate 1A3.

More specifically, as illustrated in the upper view of FIG. 19, the fourth beam plate 1C4 includes: a base portion NR extending backward along a plate plane direction (X-axis direction) of the third side plate 1A3; a bent portion NF bent from the end (back end) of the base portion NR inward of the cover member 1; and an inner end NT extending from the end (inner end) of the bent portion NF inward of the cover member 1. The same applies to the first beam plate 1C1 to the third beam plate 1C3. Specifically, the fourth beam plate 1C4 and the first beam plate 1C1 are in a line symmetry with respect to the vibration axis VA in a bottom plan view, and the fourth beam plate 1C4 and the third beam plate 1C3 are in a line symmetry with respect to a dashed line L6 in a bottom plan view. The dashed line L6 is a line segment that passes through the center of the cover member 1 and is perpendicular to the vibration axis VA. The third beam plate 1C3 and the second beam plate 1C2 are in a line symmetry with respect to the vibration axis VA in a bottom plan view, and the first beam plate 1C1 and the second beam plate 1C2 are in a line symmetry with respect to the dashed line L6 in a bottom plan view.

In the illustrated example, the cover member 1 is formed by applying a shearing force, a bending force, or the like, to a single metal plate. The fourth beam plate 1C4 is cut so as to have a shape as illustrated in the lower view of FIG. 19, then is bent at the bent portion NF, and formed in an L shape in a bottom plan view as illustrated in FIG. 18. The same applies to the first beam plate 1C1 to the third beam plate 1C3.

Further, the fourth beam plate 1C4 is formed to include a projecting portion NP at the lower end of the inner end NT, as illustrated in the lower view of FIG. 19. The projecting portion NP is a portion that contacts the upper surface of the attachment plate 11A of the bracket 11. In FIG. 19, for clarification, the projecting portion NP is provided with a dot pattern. In the illustrated example, the projecting portion NP includes: a first corner NPR that is a round corner; and a second corner NPS that is an angular corner. The first corner NPR, which is the round corner, is a structure configured to facilitate (not disturb) inward sliding of the projecting portion NP on the upper surface of the attachment plate 11A when the projecting portion NP of the beam plate 1C is contacted with the upper surface of the attachment plate 11A of the bracket 11. Meanwhile, the second corner NPS, which is the angular corner, is a structure configured to suppress outward sliding of the projecting portion NP on the upper surface of the attachment plate 11A when the projecting portion NP of the beam plate 1C is contacted with the upper surface of the attachment plate 11A of the bracket 11. Details of the contact between the projecting portion NP and the upper surface of the attachment plate 11A will be described below.

Figure 20:
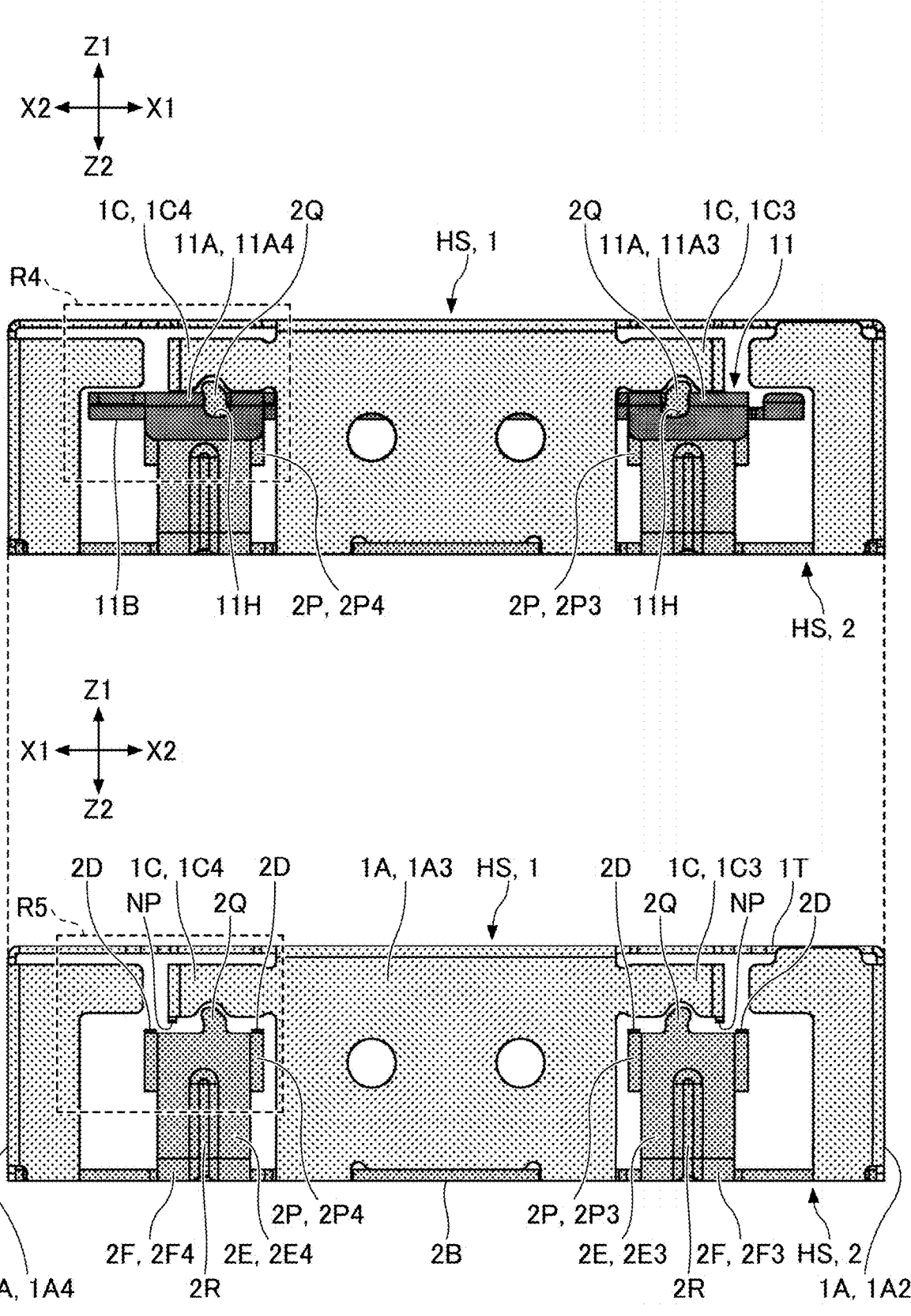
FIG. 20 is left-hand side views of the vibration generating device.
Figure 21:
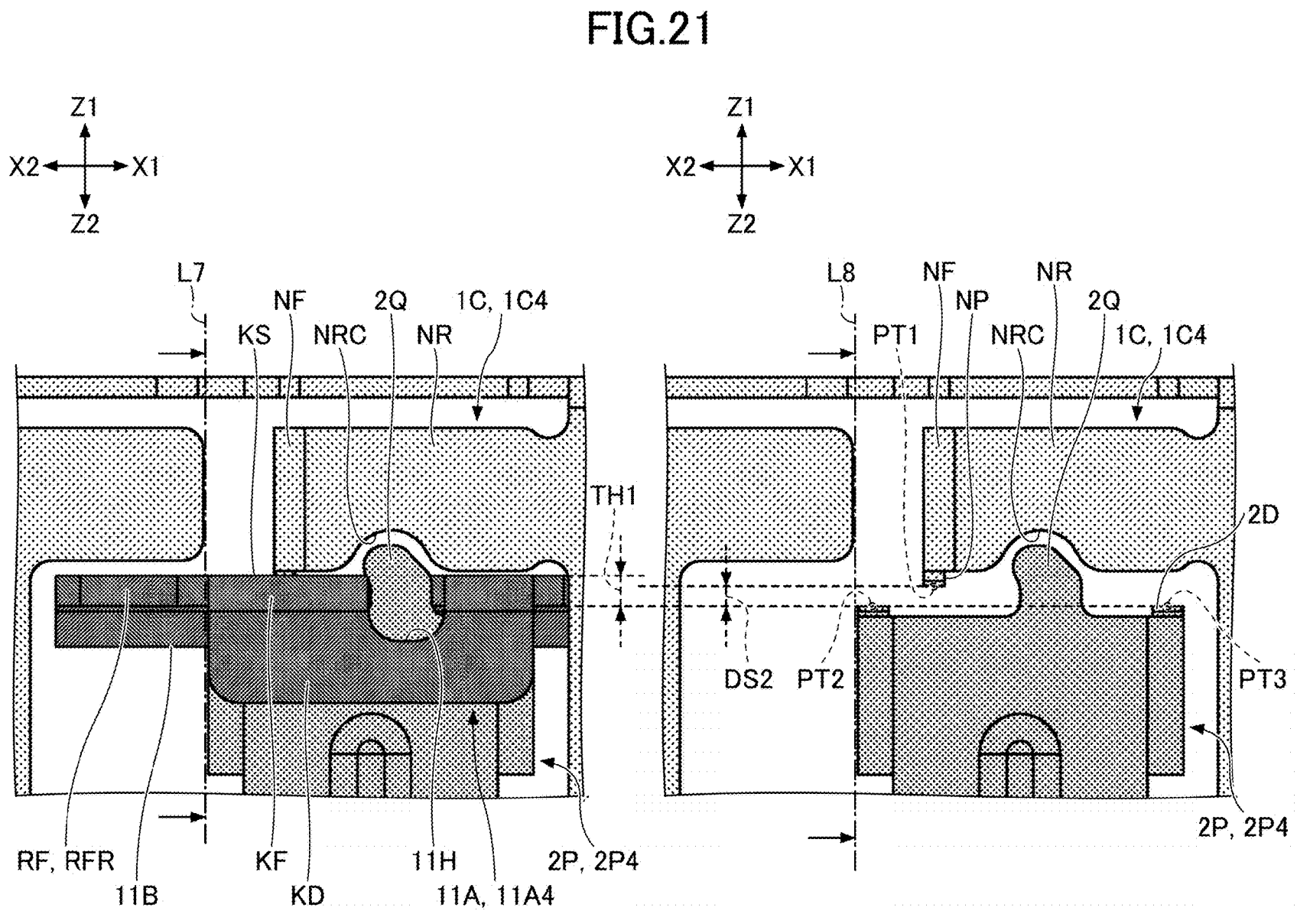
Figure 22:
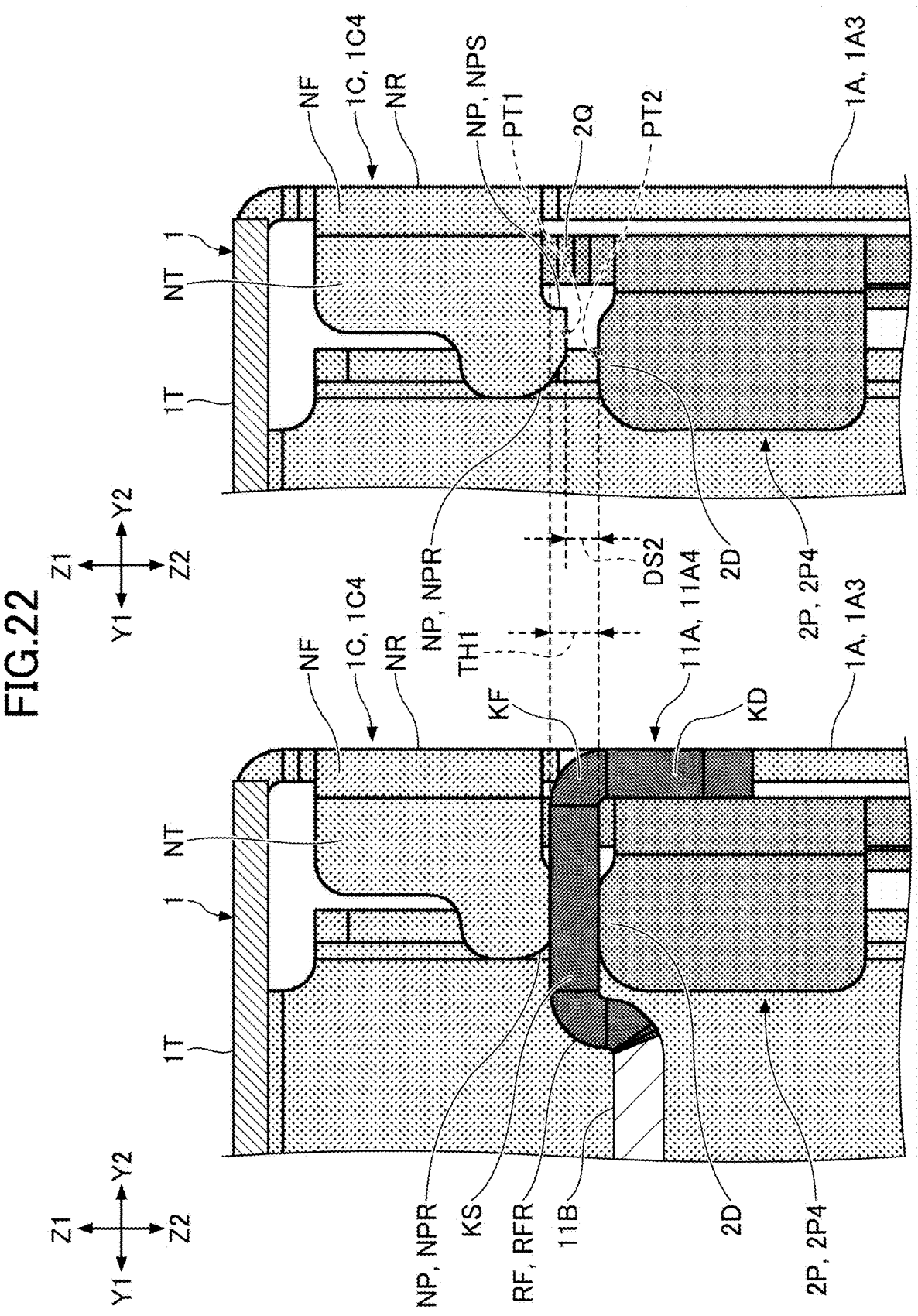
FIG. 22 is cross-sectional views of the part of the vibration generating device.
Figure 23:
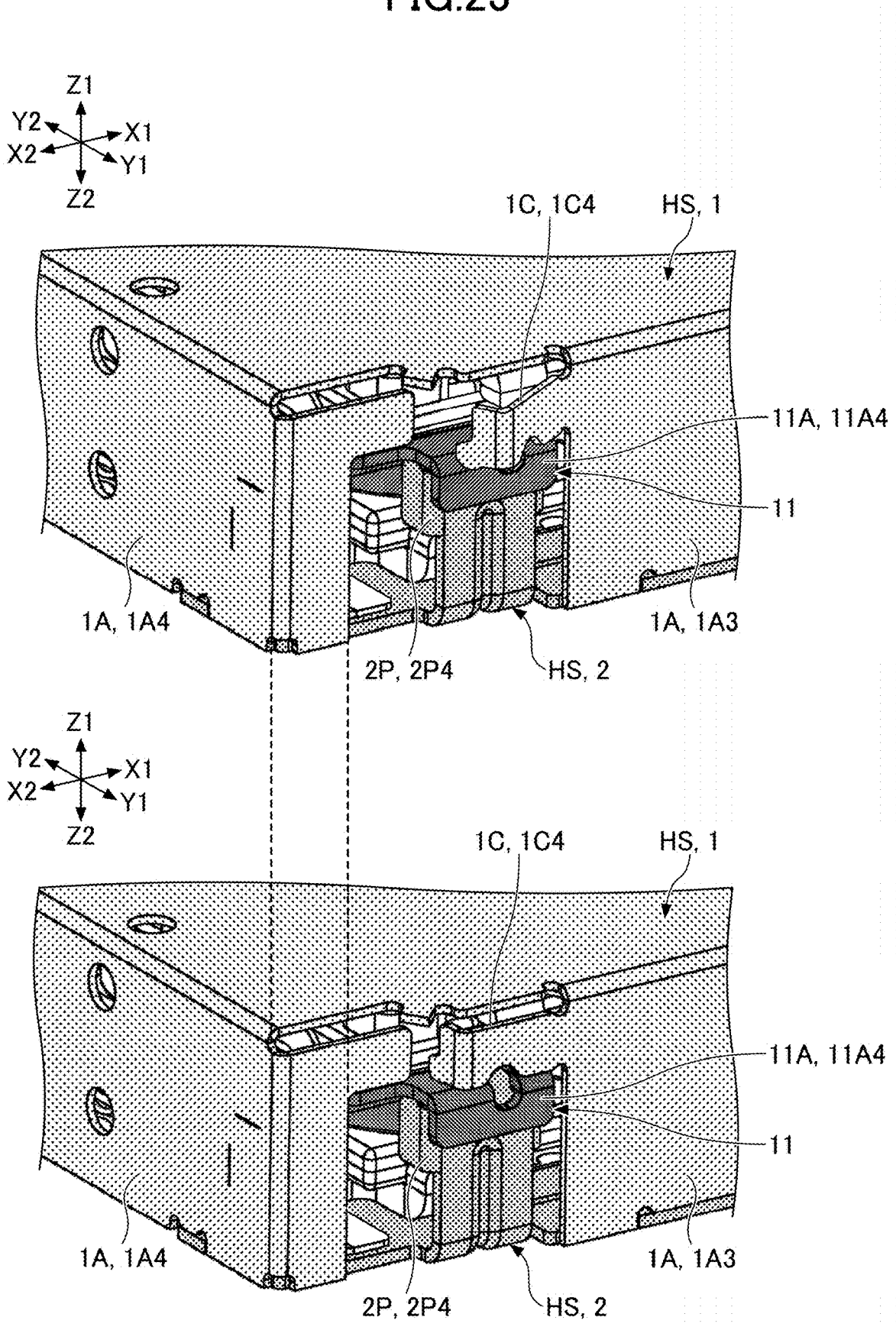
FIG. 23 is perspective views of the part of the vibration generating device.

Next, the connection relationship between the cover member 1, the base member 2, and the bracket 11 will be described with reference to FIGS. 20 to 23. FIG. 20 is left-hand side views of the vibration generating device 101. Specifically, the upper view of FIG. 20 is a left-hand side view of the vibration generating device 101 in which illustration of the members other than the cover member 1 and the base member 2 is omitted, and the lower view of FIG. 20 is a left-hand side view of the vibration generating device 101 in which illustration of the members other than the cover member 1, the base member 2, and the bracket 11 is omitted. FIG. 21 is left-hand side views of a part of the vibration generating device 101. Specifically, the left-hand view of FIG. 21 is an enlarged view of a part included in a range R4 enclosed by a dashed line in the upper view of FIG. 20, and the right-hand view of FIG. 21 is an enlarged view of a part included in a range R5 enclosed by a dashed line in the lower view of FIG. 20. FIG. 22 is cross-sectional views of a part of the vibration generating device 101. Specifically, the left-hand view of FIG. 22 is a view, as seen from the X2 side, of a cross section of the members in an imaginary plane parallel to the YZ plane including a dashed line L7 as illustrated in the left-hand view of FIG. 21, and the right-hand view of FIG. 22 is a view, as seen from the X2 side, of a cross section of the members in an imaginary plane parallel to the YZ plane including a dashed line L8 as illustrated in the right-hand view of FIG. 21. FIG. 23 is perspective views of the left-hand back portion of the vibration generating device 101. Specifically, the upper view of FIG. 23 is a perspective view of the vibration generating device 101 in a state in which the beam plate 1C is bent outward (when the attachment plate 11A is not held between the beam plate 1C of the cover member 1 and the attachment plate support 2P of the base member 2). The lower view of FIG. 23 is a perspective view of the vibration generating device 101 in a state in which the beam plate 1C is pushed inward (when the attachment plate 11A is held between the beam plate 1C of the cover member 1 and the attachment plate support 2P of the base member 2).

As illustrated in FIG. 20, the bracket 11 is formed to be held between the cover member 1 and the base member 2 in the Z-axis direction. Specifically, the attachment plate 11A of the bracket 11 (see the upper view of FIG. 20) is held between the cover member 1 (beam plate 1C) and the base member 2 (attachment plate support 2P) in a state in which the upper surface thereof is contacted with the projecting portion NP (see the lower view of FIG. 20) of the beam plate 1C of the cover member 1 and the lower surface thereof is contacted with the two projecting supports 2D (see the lower view of FIG. 20) of the attachment plate support 2P of the base member 2.

More specifically, as illustrated in the left-hand view of FIG. 22, the attachment plate 11A includes: a flat plate KS extending parallel to an XY plane; a bent portion KF bending downward from the outer end of the flat plate KS; and an end portion KD extending downward from the lower end of the bent portion KF. As illustrated in the left-hand view of FIG. 21, the through-hole 11H is formed in the attachment plate 11A so as to penetrate the flat plate KS, the bent portion KF, and the end portion KD, and a projection 20 in the attachment plate support 2P of the base member 2 is inserted into the through-hole 11H.

As illustrated in the lower views of FIGS. 2 and 20, the base member 2 includes: a bottom plate 2B extending parallel to the XY plane; a bent portion 2F bending upward from the outer ends (left-hand end and right-hand end) of the bottom plate 2B; an upright plate 2E extending upward from the upper end of the bent portion 2F; and the attachment plate support 2P provided at the upper portion of the upright plate 2E. Specifically, as illustrated in FIG. 2, the first attachment plate support 2P1 is provided at the upper portion of a first upright plate 2E1, the first upright plate 2E1 is formed so as to extend upward from the upper end of a first bent portion 2F1, and the first bent portion 2F1 is formed so as to bend upward from the right-hand back end of the bottom plate 2B. Also, the second attachment plate support 2P2 is provided at the upper portion of a second upright plate 2E2, the second upright plate 2E2 is formed so as to extend upward from the upper end of a second bent portion 2F2, and the second bent portion 2F2 is formed so as to bend upward from the right-hand front end of the bottom plate 2B. Also, the third attachment plate support 2P3 is provided at the upper portion of a third upright plate 2E3, the third upright plate 2E3 is formed so as to extend upward from the upper end of a third bent portion 2F3, and the third bent portion 2F3 is formed so as to bend upward from the left-hand front end of the bottom plate 2B. Also, the fourth attachment plate support 2P4 is provided at the upper portion of a fourth upright plate 2E4, the fourth upright plate 2E4 is formed so as to extend upward from the upper end of a fourth bent portion 2F4, and the fourth bent portion 2F4 is formed so as to bend upward from the left-hand back outer end of the bottom plate 2B. In FIG. 2, for clarification, the first attachment plate support 2P1 to the fourth attachment plate support 2P4 are provided with a dot pattern.

As illustrated in the lower view of FIG. 20, the bent portion 2F, the upright plate 2E, and the attachment plate support 2P are provided with a reinforcing recess 2R that extends over these three portions. That is, the reinforcing recess 2R is provided to suppress bending of the bent portion 2F, the upright plate 2E, and the attachment plate support 2P.

Before the cover member 1 is bonded to the base member 2 as illustrated in the lowermost view of FIG. 12, the beam plate 1C of the cover member 1 is bent outward as illustrated in the upper view of FIG. 23. In this state, the attachment plate 11A is supported by the attachment plate support 2P of the base member 2, but is not held between the beam plate 1C of the cover member 1 and the attachment plate support 2P of the base member 2, and thus the attachment plate 11A is movable upward. Subsequently, when the beam plate 1C is pushed inward, as illustrated in the lower view of FIG. 23, the attachment plate 11A is held between the beam plate 1C of the cover member 1 and the attachment plate support 2P of the base member 2, and thus the attachment plate 11A is restricted from moving in the vertical direction (Z-axis direction).

The upper view of FIG. 20, the left-hand view of FIG. 21, and the left-hand view of FIG. 22 illustrate a state in which the attachment plate 11A is held between the attachment plate support 2P and the beam plate 1C that is pushed inward as described above.

In order to avoid interference between the beam plate 1C and the projection 20 of the attachment plate support 2P when the beam plate 1C is pushed inward, a cut-out portion NRC is formed at the lower edge of the base portion NR of the beam plate 1C as illustrated in FIG. 21.

When the beam plate 1C is pushed inward, the first corner NPR, which is the round corner, of the projecting portion NP (see the lower view of FIG. 19) of the beam plate 1C contacts and slides on the upper surface of the attachment plate 11A. The first corner NPR, which is the round corner, of the projecting portion NP provides the effect of promoting inward movement (sliding) of the projecting portion NP by virtue of the shape thereof. Meanwhile, the second corner NPS, which is the angular corner, of the projecting portion NP provides the effect of suppressing outward movement (sliding) of the projecting portion NP by virtue of the shape thereof.

When the first corner NPR, which is the round corner, contacts and slides on the upper surface of the attachment plate 11A, the upper surface of the attachment plate 11A is partially scraped or partially recessed by the first corner NPR. This is because in the illustrated example, the attachment plate 11A is formed of a material (copper) having a strength lower than that of a material (stainless steel) forming the beam plate 1C.

Specifically, as illustrated in FIGS. 21 and 22, the attachment plate 11A is formed such that a plate thickness TH1 in the Z-axis direction is larger than a distance DS2 in the Z-axis direction between the projecting portion NP of the beam plate 1C and the projecting support 2D of the attachment plate support 2P. Therefore, when the beam plate 1C is pushed inward, the upper surface of the attachment plate 11A is partially scraped or partially recessed by contacting the projecting portion NP of the beam plate 1C.

In a state in which the beam plate 1C is pushed inward, the upper surface of the attachment plate 11A and the projecting portion NP of the beam plate 1C contact each other at a first contact PT1, the lower surface of the attachment plate 11A and one of the two projecting supports 2D of the attachment plate support 2P contact each other at a second contact PT2, and the lower surface of the attachment plate 11A and the other projecting support 2D of the attachment plate support 2P contact each other at a third contact PT3. That is, the attachment plate 11A is supported at three points by the beam plate 1C of the cover member 1 and the attachment plate support 2P of the base member 2. In the above description, the first contact PT1 to the third contact PT3, which are the terms related to a point contact, are used to simplify the description. However, the contact between the attachment plate 11A and the cover member 1 or the base member 2 is a plane contact in practice.

In the illustrated example, in the state in which the beam plate 1C is pushed inward, the outer surface of the base portion NR of the beam plate 1C, the outer surface of the third side plate 1A3, and the outer surface of the end portion KD of the attachment plate 11A are flush with each other as illustrated in the left-hand view of FIG. 22. That is, the beam plate 1C does not project beyond the outer surface of the outer peripheral wall portion 1A (third side plate 1A3) and does not project beyond the outer surface of the end portion KD of the attachment plate 11A. Therefore, with this configuration, the vibration generating device 101 is readily controlled in dimensions compared to a configuration in which the bracket 11 is bonded to the housing HS through welding, with an adhesive, or the like.

As described above, the bracket 11 and the housing HS are bonded to each other by plastically deforming the flat plate KS, which is a part of the attachment plate 11A, by contact with the beam plate 1C, i.e., by caulking a part of the attachment plate 11A. The caulking is a method of bonding two parts by partially plastically deforming the parts. In other words, the bracket 11 is held and fixed between the cover member 1 (beam plate 1C) and the base member 2 (attachment plate support 2P) by pushing inward and deforming the beam plate 1C, which is a part of the cover member 1, i.e., by caulking a part of the cover member 1.

As described above, the vibration generating device 101 according to an embodiment of the present disclosure includes, as illustrated in FIGS. 1 to 3: the housing HS; the movable body (vibrating body VB) housed in the housing HS; the support (elastic support ES) configured to support the movable body (vibrating body VB) so as to be vibratable along the first direction (X-axis direction); the coil 12 including the main wire bundle MW extending along the second direction (Y-axis direction) perpendicular to the first direction (X-axis direction); and the magnetic flux generating member (magnet 15) configured to generate a magnetic flux passing through the main wire bundle MW along a third direction (Z-axis direction) perpendicular to the first direction (X-axis direction) and the second direction (Y-axis direction). The vibration generating device 101 is configured such that the coil 12 is fixed to the housing HS, and the magnetic flux generating member (magnet 15) is fixed to the movable body (vibrating body VB). Also, the vibration generating device 101 includes the conductive member (bracket 11) that is fixed to the coil 12, extends along the first direction (X-axis direction) so as to traverse the magnetic flux, and is configured to generate an eddy current in response to movement of the movable body (vibrating body VB) along the first direction (X-axis direction) and reduce acceleration (vibration acceleration) of the movable body (vibrating body VB).

With this configuration, the magnetic flux generating member (magnet 15) and the conductive member (bracket 11) can generate a braking force (force to suppress vibration) like a gel-like damper that generates viscous resistance. Also, this configuration can suppress resonance of the vibrating body VB by the action of the braking force. In this configuration, the braking force is attributed to the eddy current. Therefore, this configuration, not including a deformable portion or a sliding portion, such as a gel-like damper or the like, provides the effect of being able to increase durability of the vibration generating device 101.

Also, in a typical vibration generating device, the braking force attributed to the eddy current can be an undesired force that reduces the vibration acceleration. However, the vibration generating device 101 according to an embodiment of the present disclosure is configured to suppress the resonance of the vibrating body VB by actively utilizing the braking force attributed to the eddy current.

The conductive member (bracket 11) may be formed of a non-magnetic metal. This configuration can prevent a magnetic force (attractive force) from acting between the conductive member and the magnet 15 as in the case in which the conductive member (bracket 11) is formed of a magnetic metal. Thus, this configuration provides the effect of being able to prevent such an attractive force from inhibiting efficient use of the driving force caused by the driver DM.

Also, the conductive member (bracket 11) may be formed of a material having conductivity higher than that of iron or an iron alloy. This configuration provides the effect of being able to increase a braking force (force to suppress vibration) attributed to the eddy current. This is because the braking force attributed to the eddy current increases as the conductivity increases. Therefore, for example, this configuration provides the effect of being able to suppress the resonance of the vibrating body VB that is heavier.

Also, the conductive member (bracket 11) may desirably be formed of copper, aluminum, alloys thereof, or the like. This configuration provides the effect of being able to reduce material cost compared to a case in which the conductive member is formed of a noble metal, such as silver, alloys thereof, or the like.

The conductive member (bracket 11) may be provided between the magnetic flux generating member (magnet 15) and the coil 12. Compared to a case in which the coil 12 is disposed between the conductive member (bracket 11) and the magnetic flux generating member (magnet 15), this configuration can dispose the conductive member (bracket 11) at a position near the magnetic flux generating member (magnet 15). Thus, this configuration provides the effect of being able to increase the braking force (force to suppress vibration). This is because the density of the magnetic flux passing through the conductive member (bracket 11) becomes higher as the conductive member (bracket 11) becomes closer to the magnetic flux generating member (magnet 15), and the braking force becomes greater as the density of the magnetic flux passing through the conductive member (bracket 11) becomes higher.

The vibration generating device 101 may also include a magnetic flux attracting member configured to attract a magnetic flux at a position apart from the magnetic flux generating member (magnet 15) along the third direction (Z-axis direction). In this case, the conductive member (bracket 11) may be disposed between the magnetic flux generating member (magnet 15) and the magnetic flux attracting member. In the illustrated example, the magnet 15 functions as both of the magnetic flux generating member and the magnetic flux attracting member, and the yoke 10 functions as the magnetic flux attracting member. Specifically, when the upper magnet 150 functions as the magnetic flux generating member, the lower yoke 10D and the lower magnet 15D function as the magnetic flux attracting member. Also, when the lower magnet 15D functions as the magnetic flux generating member, the upper yoke 10U and the upper magnet 15U function as the magnetic flux attracting member. The upper magnet 15U or the lower magnet 15D may be omitted. When the upper magnet 15U is omitted, the lower magnet 15D functions as the magnetic flux generating member, and the upper yoke 10U functions as the magnetic flux attracting member. The same applies to a case in which the lower magnet 15D is omitted. This configuration makes a magnetic flux angle be approximately the right angle. Here, the magnetic flux angle is an angle formed between: the extending direction (X-axis direction or Y-axis direction) of the conductive member (bracket 11); and the direction (Z-axis direction) of the magnetic flux directed from the magnetic flux generating member (magnet 15) toward the magnetic flux attracting member. Thus, this configuration provides the effect of being able to increase the braking force (force to suppress vibration) compared to a case in which the magnetic flux angle is an angle other than the right angle. This is because if the magnetic flux density is the same, the braking force becomes greater as the magnetic flux angle becomes closer to the right angle.

For example, the magnetic flux generating member may be the upper magnet 15U serving as a first permanent magnet, and the magnetic flux attracting member may be the lower magnet 15D serving as a second permanent magnet. In this case, the first permanent magnet (upper magnet 15U) and the second permanent magnet (lower magnet 15D) may be disposed such that surfaces thereof facing each other have different polarities as illustrated in FIG. 7. This configuration can make the magnetic flux angle be further closer to the right angle, and thus provide the effect of being able to increase the braking force (force to suppress vibration).

As illustrated in FIG. 4, the vibration generating device 101 may include the bracket 11 that includes: the main plate 11B to which the coil 12 is to be attached; and the attachment plate 11A extending from the main plate 11B and fixed to the housing HS. The main plate 11B extends along the plane parallel to the first direction (X-axis direction) and the second direction (Y-axis direction). In this case, the coil 12 may be fixed to the housing HS (base member 2) via the bracket 11, and the magnetic flux generating member (magnet 15) may be fixed to the movable body (vibrating body VB). The main plate 11B may be formed of copper, aluminum, alloys thereof, or the like, and may be configured to function as a conductive member. This configuration provides the effect of being able to reduce the number of parts compared to a case in which a member other than the bracket 11 (main plate 11B) functions as the conductive member.

The conductive member (bracket 11) may be configured so as not to have the openings at the position corresponding to the trajectory TR (see the upper view of FIG. 4) of the center of the magnetic flux generated upon vibration of the movable body (vibrating body VB). That is, the conductive member (bracket 11) may be configured so as to always cross the magnetic flux at least in the center region CR upon vibration of the movable body (vibrating body VB). This configuration provides the effect that the eddy current is more likely to flow than in a case in which the movable body (vibrating body VB) has openings that cross the trajectory TR.

The coil 12 may also include: the hollow core AC that is the innermost portion of the coil-wound portion; and the conductor portion CP that extends outward of the hollow core AC. The conductive member (bracket 11) may also include the openings (see the first openings H1 in the upper view of FIG. 4) that prevent interference with the conductor portion CP upon attachment of the coil 12. In this case, the openings (first openings H1) may be formed at the positions that avoid the trajectory TR. That is, the openings (first openings H1) may be formed at the positions that avoid the center region CR. This configuration prevents interference between the conductor portion CP and the conductive member (bracket 11), thereby providing the effect that the eddy current is more likely to flow than in a case in which the openings (first openings H1) cross the trajectory TR.

The hollow core AC may be formed in an elongated hole extending along the second direction (Y-axis direction) as illustrated in the lower view of FIG. 4. In this case, the conductor portion CP may be configured to extend outward from the end of the hollow core AC in the second direction (Y-axis direction) as illustrated in the upper view in FIG. 4. In the example as illustrated in the upper view in FIG. 4, the first conductor portion CP1 is configured to extend forward (in the X1 direction) from the left-hand end (Y1-side end) of the hollow core AC. Compared to a case in which the first conductor portion CP1 is configured to extend outward from a portion other than the end of the hollow core AC (e.g., the center portion), this configuration provides the effect of being able to form the openings (first opening H1) at the positions apart from the trajectory TR. The same applies to a second conductor portion CP2 and a third conductor portion CP3.

Also, the vibration generating device 101 according to an embodiment of the present disclosure includes, as illustrated in FIGS. 1 to 3: the housing HS; the movable body (vibrating body VB) housed in the housing HS; the support (elastic support ES, leaf spring 17) configured to support the movable body (vibrating body VB) so as to be vibratable along the first direction (X direction, forward-backward direction);

the bracket 11 that is attached to the housing HS (base member 2) via the attachment plate 11A and that includes the reinforcing portion RF (see FIG. 14) including the main plate 11B extending in the second direction (Y-axis direction, leftward-rightward direction) perpendicular to the first direction (X-axis direction), and the first reinforcing plate RP1 (see FIG. 14) extending in the third direction (Z-axis direction, upward-downward direction), perpendicular to the first direction (X-axis direction) and the second direction (Y-axis direction), from one end (Y1-end, left-hand end) of the main plate 11B in the second direction (Y-axis direction) via the first bending portion FD1 (see FIG. 14); the coil 12 that is attached to one side (Z2 side, lower side) of the main plate 11B in the third direction (Z-axis direction) and that includes the main wire bundles MW (see FIG. 4) each including the conductive wires extending in the second direction (Y-axis direction) and the sub wire bundle SW (see FIG. 4) connecting two of the main wire bundles MW next to each other; and the permanent magnet (magnet 15) that is attached to the movable body (yoke 10) on the other side (Z1 side, upper side) of the coil 12 in the third direction (Z-axis direction) and that is configured to generate the magnetic flux toward the main wire bundles MW. As illustrated in FIG. 14, one end (left-hand end LE1) of the permanent magnet (magnet 15) in the second direction (Y-axis direction) is located on the inner side (Y2 side) by the distance DS1 (see also the center view of FIG. 7) from one end (left-hand end LE2) of the sub wire bundle SW in the second direction (Y-axis direction). The fact that the left-hand end LE1 is located on the inner side (Y2 side) of the left-hand end LE2 means that the left-hand end LE1 is located closer to the center point of the vibrating body VB than is the left-hand end LE2. Also, the first reinforcing plate RP1 is provided on the inner side (Y2 side) of one end (left-hand end LE2) of the sub wire bundle SW in the second direction (Y-axis direction) and extends from the outer position (point PS1) of one end (left-hand end LE1) of the permanent magnet (magnet 15) in the second direction (Y-axis direction) toward the other side (Z1 side, upper side) in the third direction (Z-axis direction). The outer position of the left-hand end LE1 means a position that is farther from the center point of the vibrating body VB than is the left-hand end LE1. In the illustrated example, the point PS1 corresponds to the position at the inner end and the lower end of the first reinforcing plate RP1.

In this configuration, at least a part of the reinforcing portion RF is provided in the space SP (see FIG. 14). Thus, this configuration provides the effect that miniaturization is more likely to be achieved than in a configuration in which the reinforcing portion is provided outward of the coil. In the example as illustrated in FIG. 14, the space SP corresponds to the upper magnet 15U-free portion of the space located above the coil 12 (space having the same cross section as that of the coil 12 in the XY plane). Specifically, the space SP corresponds to the upper magnet 15U-free portion of the space located above the sub wire bundle SW of the coil 12. No permanent magnet is disposed in the space SP. This is because even if a permanent magnet is disposed, the permanent magnet cannot efficiently generate a driving force suitable for driving the vibrating body VB. Therefore, the space SP is suitable as a place in which at least a part of the reinforcing section RF is to be disposed without reducing the driving force generated by the driver DM.

Also, as illustrated in FIG. 14, the reinforcing portion RF may include the second reinforcing plate RP2 extending from the other end (Z1 end, upper end) of the first reinforcing plate RP1 in the third direction (Z-axis direction) toward the outer side (Y1 side, left-hand side) in the second direction (Y-axis direction) via the second bending portion FD2. That is, the reinforcing portion RF may be a structure formed through what is called Z-bending.

This structure provides the effect of being able to further increase the strength of the bracket 11 compared to the reinforcing portion RF including a portion that does not include the second reinforcing plate RP2 as illustrated in the lower view of FIG. 15.

The attachment plate 11A may extend outward (in the Y1 direction) from the outer end (left-hand end LE3) of the second reinforcing plate RP2 as illustrated in FIG. 14.

This configuration provides the effect of being able to more reliably suppress deformation of the main plate 11B compared to a configuration in which the attachment plate 11A extends from the main plate 11B as illustrated in the lower view of FIG. 15.

Also, as illustrated in FIG. 13, the bracket 11 may be formed of a metal plate having material marks, such as roll marks RM or the like. In this case, the reinforcing portion RF may include the first bending portion FD1 formed such that a bending line FL extends along a direction (X-axis direction) crossing the direction (Y-axis direction) of the material marks (roll marks RM). That is, the reinforcing portion RF may be formed such that the first bending portion is not formed such that the bending line extends along a direction (Y-axis direction) parallel to the direction (Y-axis direction) of the material marks (roll marks RM). The bending line FL is a line that is formed by bending the metal plate in order to form the first bending portion FD1.

This configuration provides the effect that the bracket 11 is more likely to be durable to loads applied from various directions.

Also, the bracket 11 may be formed of a metal (e.g., copper, aluminum, silver, alloys thereof, or the like) that has a strength lower than that of the material forming the housing HS (e.g., austenitic stainless steel or the like). In this case, the bracket 11 may be configured to reduce the acceleration of the movable body (vibrating body VB) by generating the eddy current so as to cancel change in the magnetic flux generated when the permanent magnet (magnet 15) attached to the movable body (yoke 10) moves along the first direction (X-axis direction).

This configuration provides the effect of being able to achieve the bracket 11 formed of the material that is more likely to generate the eddy current.

According to the vibration generating device 101 according to an embodiment of the present disclosure, as illustrated in FIG. 2, the housing HS includes the bottom plate 2B, the side plate (first side plate 1A1 and third side plate 1A3) perpendicular to the bottom plate 2B, and the attachment plate support 2P configured to support the attachment plate 11A of the bracket 11. The side plate (first side plate 1A1 and third side plate 1A3) includes the beam plate 1C provided so as to face the attachment plate support 2P in the plate thickness direction (direction parallel to the Z-axis direction, direction perpendicular to the XY plane) of the main plate 11B of the bracket 11. The attachment plate 11A is disposed such that the plate thickness direction (direction parallel to the Z-axis direction, direction perpendicular to the XY plane) of the beam plate 1C that is a part of the side plate (first side plate 1A1 and third side plate 1A3) crosses (becomes perpendicular to) the plate thickness direction of the main plate 11B of the bracket 11. Also, the attachment plate 11A is held between the attachment plate support 2P and the beam plate 1C. In the illustrated example, the attachment plate 11A is disposed such that the plate thickness direction of the beam plate 1C becomes perpendicular to the plate thickness directions of the attachment plate 11A and the main plate 11B of the bracket 11.

According to the vibration generating device 101 having this configuration, the bracket 11 serving as a coil bracket is firmly fixed to the housing HS without welding. Therefore, according to the vibration generating device 101, the housing HS and the bracket 11 are firmly bonded together even if they are formed of different metals. In the illustrated example, the bonding between the bracket 11 and the housing HS is achieved by pushing the beam plate 1C of the cover member 1, bent outward as illustrated in the upper view of FIG. 23, inward as illustrated in the lower view of FIG. 23. Therefore, the bonding between the bracket 11 and the housing HS can be achieved more readily than, for example, in a case of using welding. Alternatively, the bonding between the bracket 11 and the housing HS can be achieved in a smaller space than in a case of using an adhesive. This is because it is necessary to provide an adhesive reservoir in the vibration generating device 101 when using the adhesive. In the above-described embodiment, the beam plate 1C is a part of the cover member 1, but may be a part of the base member 2.

Also, with this configuration, the bracket 11 is held by the housing HS utilizing an elastic force in the plate plane direction of the beam plate 1C (direction parallel to the Z-axis direction, direction perpendicular to the XY plane) crossing the plate thickness direction of the beam plate 1C (direction perpendicular to the Z-axis direction, direction parallel to the XY plane). Thus, the bracket 11 can be more firmly held by the housing HS than in a case of utilizing an elastic force in a plate thickness direction of a plate.

Also, in this configuration, the direction in which the beam plate 1C is bent (inward along the Y-axis direction) is different from the direction in which the beam plate 1C presses the attachment plate 11A (downward along the Z-axis direction). Therefore, this configuration provides the effect that the beam plate 1C bent with a relatively small force can press the attachment plate 11A with a relatively great force.

Also, the bracket 11 may be formed of a metal material having a melting point lower than that of a metal material forming the housing HS. This is because although two metal materials having different melting points cannot be successfully bonded together through welding, the housing HS and the bracket 11 are bonded to each other without welding in the above-described configuration.

The bracket 11 may be formed of a metal material having a strength lower than that of a metal material forming the housing HS. This is because if two metal materials having different strengths are bonded together through welding, the resulting welded product can be likely to break; however, the housing HS and the bracket 11 are bonded together without welding in the above-described configuration.

Also, the bracket 11 may be configured to generate the eddy current by the magnetic flux generated from the permanent magnet (magnet 15) when the movable body (vibrating body VB) is vibrating, thereby reducing the acceleration of the movable body (vibrating body VB).

This configuration provides the effect of being able to utilize the braking force (force to suppress vibration) derived from the eddy current. Therefore, for example, this configuration provides the effect of being able to suppress resonance of the vibrating body VB.

Also, the housing HS may include the base member 2 as illustrated in FIG. 2. That is, the housing HS may be formed of two members (cover member 1 and base member 2). In this case, the base member 2 may include: the bottom plate 2B; the upright plate 2E extending upward from the bottom plate 2B via the bent portion 2F; and the attachment plate support 2P provided at the upper portion of the upright plate 2E.

This configuration provides the effect of facilitating assembly of the vibration generating device 101. This is because the members thereof are assembled in the order as illustrated in FIGS. 11 and 12, and finally the cover member 1 is bonded to the base member 2, thereby assembling the vibration generating device 101.

Also, one of the attachment plates 11A (first attachment plate 11A1 to fourth attachment plate 11A4) in the bracket 11 may be supported at three points by one of the beam plates 1C (first beam plate 1C1 to fourth beam plate 1C4) and one of the attachment plate supports 2P (first attachment plate support 2P1 to fourth attachment plate support 2P4). As illustrated in FIGS. 21 and 22, the fourth attachment plate 11A4 is supported at three points (first contact PT1 to third contact PT3) by the fourth beam plate 1C4 and the fourth attachment plate support 2P4.

This configuration provides the effect of being able to suppress rattling of the bracket 11 with respect to the housing HS when the bracket 11 is held by the housing HS. The housing HS can firmly hold the bracket 11 by supporting each of the four attachment plates 11A at three points, i.e., by supporting the bracket 11 at a total of 12 points that are four points on the upper surface side and eight points on the lower surface side.

Specifically, as illustrated in FIGS. 21 and 22, the beam plate 1C may include an upper contact (projecting portion NP) that projects toward the attachment plate 11A in a direction perpendicular to the attachment plate 11A (Z-axis direction) and contacts the upper surface of the attachment plate 11A. Also, the attachment plate support 2P may include a lower contact (projecting support 2D) that projects toward the attachment plate 11A in a direction perpendicular to the attachment plate 11A (Z-axis direction) and contacts the lower surface of the attachment plate 11A. In this case, the distance DS2 between the upper contact (projecting portion NP) and the lower contact (projecting support 2D) in a direction perpendicular to the attachment plate 11A (Z-axis direction) may be smaller than the plate thickness TH1 of the attachment plate 11A.

With this configuration, the attachment plate 11A can receive a downward force generated by the beam plate 1C bent inward. This force increases as the difference between the plate thickness TH1 and the distance DS2 (plate thickness TH1-distance DS2) increases. That is, this configuration provides the effect that the magnitude of the downward force exerted by the beam plate 1C on the attachment plate 11A is readily adjusted by adjusting the difference between the plate thickness TH1 and the distance DS2.

Also, as illustrated in FIG. 21, the attachment plate support 2P may include the projection 20 that projects toward the attachment plate 11A in the direction (Z-axis direction) perpendicular to the flat plate KS of the attachment plate 11A and is inserted into the through-hole 11H formed in the attachment plate 11A.

This configuration provides the effect of being able to suppress the bracket 11 supported by the base member 2 from moving along the XY plane before the beam plate 1C is bent inward, i.e., before the bracket 11 is held between the cover member 1 and the base member 2.

Also, as illustrated in the lower view of FIG. 20, the reinforcing recess 2R may be formed in the upright plate 2E. The reinforcing recess 2R provides the effect of being able to suppress bending of the bent portion 2F, the upright plate 2E, and the attachment plate support 2P.

The beam plate 1C may be formed in a cantilever form as illustrated in FIG. 19. With this configuration, the beam plate 1C in the state of being bent outward as illustrated in the upper view of FIG. 23 can be pushed inward as illustrated in the lower view of FIG. 23 without application of an excessively large quantity of force. However, the beam plate 1C may be supported at both sides thereof.

Also, a production method for the vibration generating device 101 according to an embodiment of the present disclosure includes: housing the bracket 11 in the housing HS in a state in which the beam plate 1C is bent outward of the third side plate 1A3 as illustrated in the upper view of FIG. 23; and pushing the beam plate 1C inward of the third side plate 1A3, thereby contacting the beam plate 1C with the upper surface of the attachment plate 11A as illustrated in the lower view of FIG. 23.

According to the vibration generating device 101 produced by this production method, the bracket 11 serving as a coil bracket is firmly fixed to the housing HS without welding. Therefore, according to the vibration generating device 101 produced by this production method, the housing HS and the bracket 11 are firmly bonded together even if they are formed of different metals. Also, according to the vibration generating device 101 produced by this production method, the bonding between the bracket 11 and the housing HS is more readily achieved than, for example, a case of using welding, or is achieved in a smaller space than in a case of using an adhesive. This is because it is necessary to provide an adhesive reservoir in the vibration generating device 101 when using the adhesive.

Some embodiments of the present invention have been described above in detail. However, the present invention is not limited to the embodiments as described above. Various modifications, substitutions, or the like are applicable in the above-described embodiments without departing from the scope of the present invention. In addition, the features as described in the above-described embodiments may be appropriately combined unless there is any technical contraction.

For example, according to the above-described embodiments, the vibration generating device 101 is configured to include the 8-pole magnetized magnet 15 and the coil 12 including three coil-wound portions (six wire bundles). However, the vibration generating device 101 may be configured to include: the magnet 15 that is magnetized with the number of poles other than eight, e.g., two, four, six, ten, twelve, or the like; and the coil 12 including a corresponding number of wire bundles. That is, the coil 12 may be configured to include one, two, or four or more coil-wound portions.

According to the above-described embodiments, the bracket 11 may include the right-hand reinforcing portion RFR and the left-hand reinforcing portion RFL. However, the right-hand reinforcing portion RFR or the left-hand reinforcing portion RFL may be omitted. Alternatively, the bracket 11 may include a forward reinforcing portion formed at the forward end of the main plate 11B and a backward reinforcing portion formed at the backward end of the main plate 11B. In this case, the right-hand reinforcing portion RFR, the left-hand reinforcing portion RFL, the forward reinforcing portion, the backward reinforcing portion, or any combination thereof may be omitted.

According to the above-described embodiment, the left-hand reinforcing portion RFL is formed so as to extend approximately over the entire length of the left-hand edge of the main plate 11B in the X-axis direction. However, the left-hand reinforcing portion RFL may be formed so as to extend along a part of the left-hand edge of the main plate 11B. Also, the left-hand reinforcing portion RFL may be formed so as to extend along a plurality of portions of the left-hand edge of the main plate 11B. The same applies to the right-hand reinforcing portion RFR, the forward reinforcing portion, and the backward reinforcing portion.

According to the vibration generating device as described above, the coil bracket is firmly fixed to the housing without welding.

What is claimed is:

1. A vibration generating device, comprising:
a housing;
a movable body housed in the housing;
a support configured to support the movable body so as to be vibratable;
a bracket that includes a main plate and an attachment plate extending from the main plate, and is attached to the housing via the attachment plate;
a coil attached to the main plate; and
a permanent magnet attached to the movable body and configured to generate a magnetic flux toward the coil, wherein
the housing includes
a bottom plate,
a side plate perpendicular to the bottom plate, and
an attachment plate support configured to support the attachment plate of the bracket,
the side plate includes
a beam plate provided so as to face the attachment plate support in a plate thickness direction of the main plate of the bracket,
the attachment plate is disposed such that a plate thickness direction of the beam plate that is a part of the side plate crosses the plate thickness direction of the main plate of the bracket, and
the attachment plate is held between the attachment plate support and the beam plate.

2. The vibration generating device according to claim 1, wherein
the bracket is formed of a metal material having a melting point lower than a melting point of a metal material forming the housing.

3. The vibration generating device according to claim 2, wherein
the bracket is formed of the metal material having a strength lower than a strength of the metal material forming the housing.

4. The vibration generating device according to claim 1, wherein
the bracket is configured to generate an eddy current by the magnetic flux generated from the permanent magnet with the movable body vibrating, thereby reducing acceleration of the movable body.

5. The vibration generating device according to claim 1, wherein
the housing includes a base member, and
the base member includes
a bottom plate,
a bent portion,
an upright plate extending upward from the bottom plate via the bent portion, and
the attachment plate support provided at an upper portion of the upright plate.

6. The vibration generating device according to claim 1, wherein
the attachment plate in the bracket is a plurality of attachment plates,
the beam plate is a plurality of beam plates,
the attachment plate support is a plurality of attachment plate supports, and
one of the attachment plates is supported at three points by one of the beam plates and by one of the attachment plate supports.

7. The vibration generating device according to claim 1, wherein
the beam plate includes
an upper contact that projects toward the attachment plate in a direction perpendicular to the attachment plate and contacts an upper surface of the attachment plate,
the attachment plate support includes
a lower contact that projects toward the attachment plate in the direction perpendicular to the attachment plate and contacts a lower surface of the attachment plate, and
a distance between the upper contact and the lower contact in the direction perpendicular to the attachment plate is smaller than a plate thickness of the attachment plate.

8. The vibration generating device according to claim 1, wherein
the attachment plate support includes a projection that projects toward the attachment plate in a direction perpendicular to the attachment plate and that is inserted into a through-hole formed in the attachment plate.

9. The vibration generating device according to claim 5, wherein
a reinforcing recess is formed at the upright plate.

10. The vibration generating device according to claim 1, wherein
the beam plate is formed in a cantilever form.

11. A production method for a vibration generating device that includes a housing, a movable body housed in the housing, a support configured to support the movable body so as to be vibratable, a bracket that includes a main plate and an attachment plate extending from the main plate, and is attached to the housing via the attachment plate, a coil attached to the main plate, and a permanent magnet attached to the movable body and configured to generate a magnetic flux toward the coil, the housing including a bottom plate, a side plate perpendicular to the bottom plate, and an attachment plate support configured to support the attachment plate of the bracket, the side plate including a beam plate provided so as to face the attachment plate support, the attachment plate being disposed such that a plate thickness direction of the beam plate that is a part of the side plate crosses a plate thickness direction of the main plate of the bracket, and the attachment plate being held between the attachment plate support and the beam plate, the production method comprising:
housing the bracket in the housing in a state in which the beam plate is bent outward of the side plate; and
pushing the beam plate inward of the side plate, thereby contacting the beam plate with an upper surface of the attachment plate.

* * * * *